United States Patent
Johnston et al.

(10) Patent No.: US 8,718,087 B1
(45) Date of Patent: May 6, 2014

(54) PROCESSING ARCHITECTURE FOR PASSIVE OPTICAL NETWORK

(75) Inventors: Cesar A. Johnston, Sunnyvale, CA (US); John M. Chiang, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 406 days.

(21) Appl. No.: 11/877,379

(22) Filed: Oct. 23, 2007

Related U.S. Application Data

(60) Provisional application No. 60/862,665, filed on Oct. 24, 2006.

(51) Int. Cl.
*H04L 12/66* (2006.01)

(52) U.S. Cl.
USPC .......................................................... 370/463

(58) Field of Classification Search
USPC ................... 370/310, 310.1, 329, 389, 395.4
See application file for complete search history.

(56) References Cited

U.S. PATENT DOCUMENTS

| | | | |
|---|---|---|---|
| 4,078,228 A | | 3/1978 | Miyazaki |
| 4,539,676 A * | | 9/1985 | Lucas ............................ 370/354 |
| 4,731,782 A * | | 3/1988 | Shimizu et al. ............... 370/354 |
| 5,422,880 A | | 6/1995 | Heitkamp et al. |
| 6,370,300 B1 | | 4/2002 | Eggleton et al. |
| 6,498,667 B1 | | 12/2002 | Masucci et al. |
| 6,526,462 B1 | | 2/2003 | Elabd |
| 6,738,364 B1 | | 5/2004 | Saunders |
| 8,014,481 B1 | | 9/2011 | Chiang et al. |
| 2003/0048803 A1 * | | 3/2003 | Tsai et al. ...................... 370/463 |
| 2004/0101068 A1 | | 5/2004 | Wang et al. |
| 2004/0141759 A1 * | | 7/2004 | Stiscia et al. .................. 398/168 |
| 2004/0208631 A1 | | 10/2004 | Song et al. |
| 2005/0138212 A1 | | 6/2005 | Yang |
| 2005/0157641 A1 * | | 7/2005 | Roy .............................. 370/218 |
| 2007/0003282 A1 * | | 1/2007 | Boyd et al. ..................... 398/72 |
| 2007/0025734 A1 | | 2/2007 | Oogushi et al. |
| 2007/0030936 A1 | | 2/2007 | Johnson et al. |
| 2007/0064604 A1 * | | 3/2007 | Chen et al. .................... 370/230 |
| 2007/0070997 A1 * | | 3/2007 | Weitz et al. ................... 370/389 |
| 2007/0076648 A1 | | 4/2007 | Yong |

(Continued)

OTHER PUBLICATIONS

ITU-T Telecommunication Standardization Sector of ITU—G.984.4—Series G: Transmission Systems and Media, Digital Systems and Networks, Digital sections and digital line system—Optical line systems for local and access networks—Gigabit-capable Passive Optical Networks (G-PON): ONT management and control interface specification (2004).

(Continued)

*Primary Examiner* — Jason Mattis
*Assistant Examiner* — Adnan Baig

(57) ABSTRACT

In a network termination device integrated circuit in a point-to-multipoint network, a receiver receives a downstream transmission from a line termination unit within the point-to-multipoint network, a transmitter transmits an upstream transmission to the line termination unit within the point-to-multipoint network, and an internal processor operatively coupled to the receiver processes sub-fields within the overhead field of the downstream transmission. The internal processor is also operatively coupled to the transmitter to assemble the overhead field of the upstream transmission. The downstream transmission is an downstream transmission convergence frame format having an overhead field and a payload field, and the upstream transmission is an upstream transmission convergence frame format having an overhead field and a payload field.

35 Claims, 11 Drawing Sheets

(56) References Cited

U.S. PATENT DOCUMENTS

| | | | | |
|---|---|---|---|---|
| 2007/0110441 | A1* | 5/2007 | Saito et al. | 398/71 |
| 2007/0297390 | A1* | 12/2007 | Skog et al. | 370/352 |
| 2008/0002977 | A1 | 1/2008 | Mori | |
| 2008/0019693 | A1* | 1/2008 | Sorin | 398/71 |
| 2009/0245784 | A1 | 10/2009 | Wang | |

OTHER PUBLICATIONS

TU-T Telecommunication Standardization Sector of ITU—G.984.4 Amendment 1, Series G: Transmission Systems and Media, Digital Systems and Networks, Didgital sections and digital line system—Optical line systems for local and access networks—Gigabit-capable Passive Optical Networks (G-PON): ONT management and control interface specification (2005).
ITU-T Telecommunication Standardization Sector of ITU—G.984.4 Amendment 2—Series G: Transmission Systems and Media, Digital Systems and Networks, Digital sections and digital line system—Optical line systems for local and access networks—Gigabit-capable Passive Optical Networks (G-PON): ONT management and control interface specification (2006).
ITU-T Telecommunication Standardization Sector of ITU G.984.3—Series G: Transmission Systems and Media, Digital Systems and Networks, Digital sections and digital line system—Optical line systems for local and access networks—Gigabit-capable Passive Optical Networks (G-PON): Transmission convergence layer specification (2004).
ITU-T Telecommunication Standardization Sector of ITU G.984.4, Series G: Transmission Systems and Media, Digital Systems and Networks, Digital sections and digital line system—Optical line systems for local and access networks, Gigabit-capable Passive Optical Networks (G-PON): ONT management and control interface specification (2004).
ITU-T Telecommunication Standardization Sector of ITU G.984.4 Amendment 1, Series G: Transmission Systems and Media, Digital Systems and Networks—Digital sections and digital line system—Optical line systems for local and access networks, Gigabit-capable Passive Optical Networks (G-PON): ONT management and control interface specification (2005).
ITU-T Telecommunication Standardization Sector of ITU G.984.4 Amendment 2, Series G: Transmission Systems and Media, Digital Systems and Networks—Digital sections and digital line system—Optical line systems for local and access networks, Gigabit-capable Passive Optical Networks (G-PON): ONT management and control interface specification (2006).
ITU-T Telecommunication Standardization Sector of ITU—G.984.4 Amendment 3—Series G: Transmission Systems and Media, Digital Systems and Networks, Digital sections and digital line system—Optical line systems for local and access networks—Gigabit-capable Passive Optical Networks (G-PON): ONT management and control interface specification (2006).
ITU-T Telecommunication Standardization Sector of ITU—G.984.3 Amendment 1—Series G: Transmission Systems and Media, Digital Systems and Networks, Digital sections and digital line system—Optical line systems for local and access networks—Gigabit-capable Passive Optical Networks (G-PON): Transmission convergence layer specification (2005).
ITU-T Telecommunication Standardization Sector of ITU—G.984.3 Amendment 2—Series G: Transmission Systems and Media, Digital Systems and Networks, Digital sections and digital line system—Optical line systems for local and access networks—Gigabit-capable Passive Optical Networks (G-PON): Transmission convergence layer specification (2006).
U.S. Appl. No. 11/937,396, filed Nov. 8, 2007, Johnston et al.
ITU-T Telecommunication Standardization Sector of ITU—G.984.3 Amendment 3—Series G: Transmission Systems and Media, Digital Systems and Networks, Digital sections and digital line system—Optical line systems for local and access networks—Gigabit-capable Passive Optical Networks (G-PON): Transmission convergence layer specification (2006).
ITU-T Telecommunication Standardization Sector of ITU—G.984.3 Implementers' Guide—Series G: Transmission Systems and Media, Digital Systems and Networks—Gigabit-capable Passive Optical Networks (G-PON): Transmission convergence layer specification (2006).
ITU-T Telecommunication Standardization Sector of ITU—G.984. 2—Series G: Transmission Systems and Media, Digital Systems and Networks, Digital sections and digital line system—Optical line systems for local and access networks—Gigabit-capable Passive Optical Networks (G-PON): Phiysical Media Dependent (PMD) layer specification (2003).
ITU-T Telecommunication Standardization Sector of ITU—G.984.2 Amendment 1—Series G: Transmission Systems and Media, Digital Systems and Networks, Digital sections and digital line system—Optical line systems for local and access networks—Gigabit-capable Passive Optical Networks (G-PON): Physical Media Dependent (PMD) layer specification (2006).
ITU-T Telecommunication Standardization Sector of ITU—G.984. 1—Series G: Transmission Systems and Media, Digital Systems and Networks, Digital sections and digital line sysstem—Optical line systems for local and access networks—Gigabit-capable Passive Optical Networks (G-PON): General Characteristics.
ITU-T Telecommunication Standardization Sector of ITU—G.983. 4—Series G: Transmission Systems and Media, Digital Systems and Networks, Digital sections and digital line system—Optical line systems for local and access networks—A broadband optical access system with increased service capability using dynamic bandwidth assignment (2001).
ITU-T Telecommunication Standardization Sector of ITU—G.983.4 Amendment 1—Series G: Transmission Systems and Media, Digital Systems and Networks, Digital sections and digital line system—Optical line systems for local and access networks—A broadband optical access system with increased service capability using dynamic bandwidth assignment (2003).
ITU-T Telecommunication Standardization Sector of ITU—G.983.4 Corrigendum 1—Series G: Transmission Systems and Media, Digital Systems and Networks, Digital sections and digital line system—Optical line systems for local and access networks—A broadband optical access system with increased service capability using dynamic bandwidth assignment (2005).
ITU-T Telecommunication Standardization Sector of ITU—G. 652—Series G: Transmission Systems and Media, Digital Systems and Networks, Transmission media characteristics—Optical fibre cables—Characteristics of a Single-Mode Optical Fibre and Cable (2005).
ITU-T Telecommunication Standardization Sector of ITU—I.363. 1—Series I: Integrated Service Digital Network, Overall network aspects and functions—Protocol layer requirements—B-ISDN ATM Adaptation Layer Specification: Type 1 AAL (1996).
ITU-T Telecommunication Standardization Sector of ITU—I.363. 2—Series I: Integrated Service Digital Network, Overall network aspects and functions—Protocol layer requirements—B-ISDN ATM Adaptation Layer Specification: Type 2 AAL (2000).
ITU-T Telecommunication Standardization Sector of ITU—I.363. 3—Series I: Integrated Service Digital Network, Overall network aspects and functions—Protocol layer requirements—B-ISDN ATM Adaptation Layer Specification: Type 3/4 AAL (1996).
ITU-T Telecommunication Standardization Sector of ITU—I.363. 5—Series I: Integrated Service Digital Network, Overall network aspects and functions—Protocol layer requirements—B-ISDN ATM Adaptation Layer Specification: Type 5 AAL (1996).
Office action for U.S. Appl. No. 11/937,396 dated Oct. 16, 2009.
Office Action in U.S. Appl. No. 11/938,719, dated Aug. 13, 2010.
Office Action in U.S. Appl. No. 11/938,719, dated Jan. 4, 2011.
Office Action in U.S. Appl. No. 11/937,396, dated Apr. 12, 2010.
Office Action in U.S. Appl. No. 11/937,396, dated Jul. 18, 2011.
Final Office Action for U.S. Appl. No. 11/937,396, dated Dec. 30, 2011.

* cited by examiner

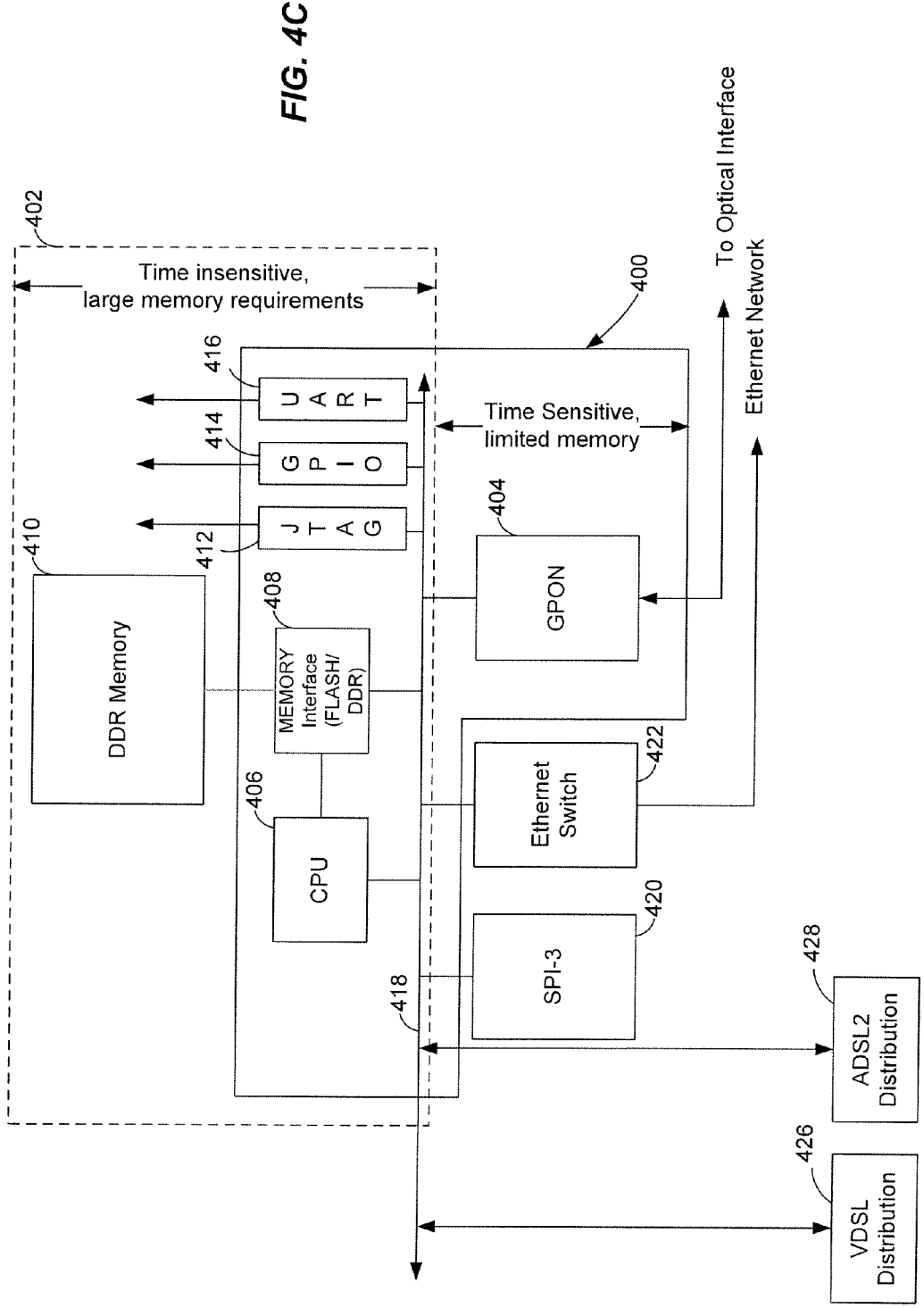

PROCESSING ARCHITECTURE FOR PASSIVE OPTICAL NETWORK

CROSS-REFERENCES TO RELATED APPLICATIONS

The present application claims the benefit of U.S. Provisional Application No. 60/862,665, entitled "GPON SOLUTION ARCHITECTURE," filed on Oct. 24, 2006, which is hereby incorporated by reference herein in its entirety.

FIELD OF TECHNOLOGY

The present disclosure relates generally to point-to-multipoint networks, and more particularly, to network termination devices in a gigabit passive optical network.

DESCRIPTION OF THE RELATED ART

Point-to-multipoint networks such as passive optical networks (PONs) provide efficient communications (voice, data, telephony, etc.) without substantial power consumption. A typical PON for example includes an optical line termination (OLT) acting as a network-side broadcast point that communicates with multiple optical network units (ONUs) and/or optical network terminations (ONTs) on the user side of the network. An optical fiber or bundle creates the connection between the OLT and the many ONTs/ONUs, where the signals are transmitted on that fiber/bundle using passive optical components (e.g., non-electrically powered).

The downstream broadcast from the OLT to the ONUs/ONTs is achieved through a downstream frame format that sets forth various overhead and payload data for the user side of the network. In most cases, that downstream broadcast would include data for each of the ONUs/ONTs, which data would have to be decoded to deter mine which data corresponds to each ONU/ONT. On the reverse path, each ONU/ONT communicates with the OLT through upstream data in the form of an upstream burst frame format, where that upstream burst must be timed so that the OLT sees data from each ONU/ONT in a timely, expected manner. The OLT provides an interface between the passive optical network and the backbone network of a service provider and is responsible for managing the ONUs/ONTs through the communication of the downstream frame formats. The downstream frame format data may include allocation of bandwidth data, ranging information, physical layer operations and maintenance data, and the like in addition to providing downstream content to the ONUs/ONTs.

The upstream and downstream transmissions include what may be considered two types of data: time-sensitive data (low latency) and non-time sensitive data. The time-sensitive functions generally will benefit from processing within a short and guaranteed time duration, which may be of particular importance for transmissions such as with telephony or video/audio broadcast services. Thus for some network configurations, the task of processing frame formats (e.g., to provide upstream payload data to a client) as well as the task for assembling frame formats for transmission should involve as little delay and jitter as possible. Whereas, on the other hand, if non-time sensitive functions were added to the functionality of an architecture otherwise responsible for time-sensitive functions unnecessary delay and jitter could result.

SUMMARY OF THE DISCLOSURE

In an embodiment, for a point-to-multipoint network, a network termination device integrated circuit comprises a receiver to receive a downstream transmission from a line termination unit within the point-to-multipoint network and upstream of a network termination device, wherein the downstream transmission comprises a downstream transmission convergence frame format having an overhead field and a payload field; a transmitter to transmit an upstream transmission to the line termination unit, wherein the upstream transmission comprises an upstream transmission convergence frame format having an overhead field and a payload field; and an internal processor to process sub-fields within the overhead field of the downstream transmission and to assemble the overhead field of the upstream transmission.

In another embodiment, a network termination device in a passive optical network comprises a system-on-a-chip (Soc) subsystem having an SoC processor and a memory interface operatively coupled to the processor, a memory operatively coupled to the memory interface, and an integrated chip having a distributed direct memory access engine operatively coupled to the SoC processor and the memory interface to interconnect the integrated circuit with the SoC sub-system and to directly access the memory. The distributed direct memory access engine includes a system-on-a-chip (SoC) interface, a first direct memory access engine operatively coupled to the SoC interface to read data from the memory, and a second direct memory access engine operatively coupled to the SoC interface to write data to the memory. In some of these embodiments, the distributed direct memory access engine further includes a descriptor and buffer management unit operatively coupled to the first direct memory access engine and adapted to manage access of the first direct memory access engine to the memory; and a memory management unit operatively coupled to the second direct memory access engine and adapted to manage access of the second direct memory access engine to the memory. In some embodiments, the integrated chip further includes a transmitter operatively coupled to the first direct memory access engine, a receiver operatively coupled to the second direct memory access engine and an internal processor operatively coupled to the transmitter and the receiver, wherein the internal processor is adapted to control the integrated chip and to execute functions requiring execution within a minimum timeframe, and wherein the SoC processor is adapted to execute functions that do not require execution within the minimum timeframe, wherein the internal processor is adapted to process a transmission header associated with a transmission and the SoC processor is adapted to process a data packet associated with the transmission.

In yet another embodiment, a method of processing a downstream transmission within a passive optical network (PON) chip of an optical network termination device in a passive optical point-to-multipoint network comprises receiving the downstream transmission from a optical line termination unit within the passive optical point-to-multipoint network; processing an overhead field of the downstream transmission within the passive optical network chip; recovering a data frame from a payload field of the downstream transmission within the passive optical network chip; and providing the recovered data frame to a packet buffer external to the passive optical network chip.

In still another embodiment, a method of processing an upstream transmission within a passive optical network (PON) chip of an optical network termination device in a passive optical point-to-multipoint network comprises receiving packet data from a packet buffer external to the passive optical network chip; assembling an overhead field of the upstream transmission within the passive optical network chip; assembling a payload field of the upstream transmission from the packet data within the passive optical network chip; and transmitting an upstream transmission frame comprising the overhead field and the payload field to a optical line termination unit within the point-to-multipoint network.

BRIEF DESCRIPTION OF THE DRAWINGS

FIGS. 4B-4D are block diagrams of example architecture implementations of the integrated circuit configuration of FIG. 4A, and in the form of an optical line termination device, optical network termination device, and an optical network unit device, respectively.

DETAILED DESCRIPTION

Figure 1:
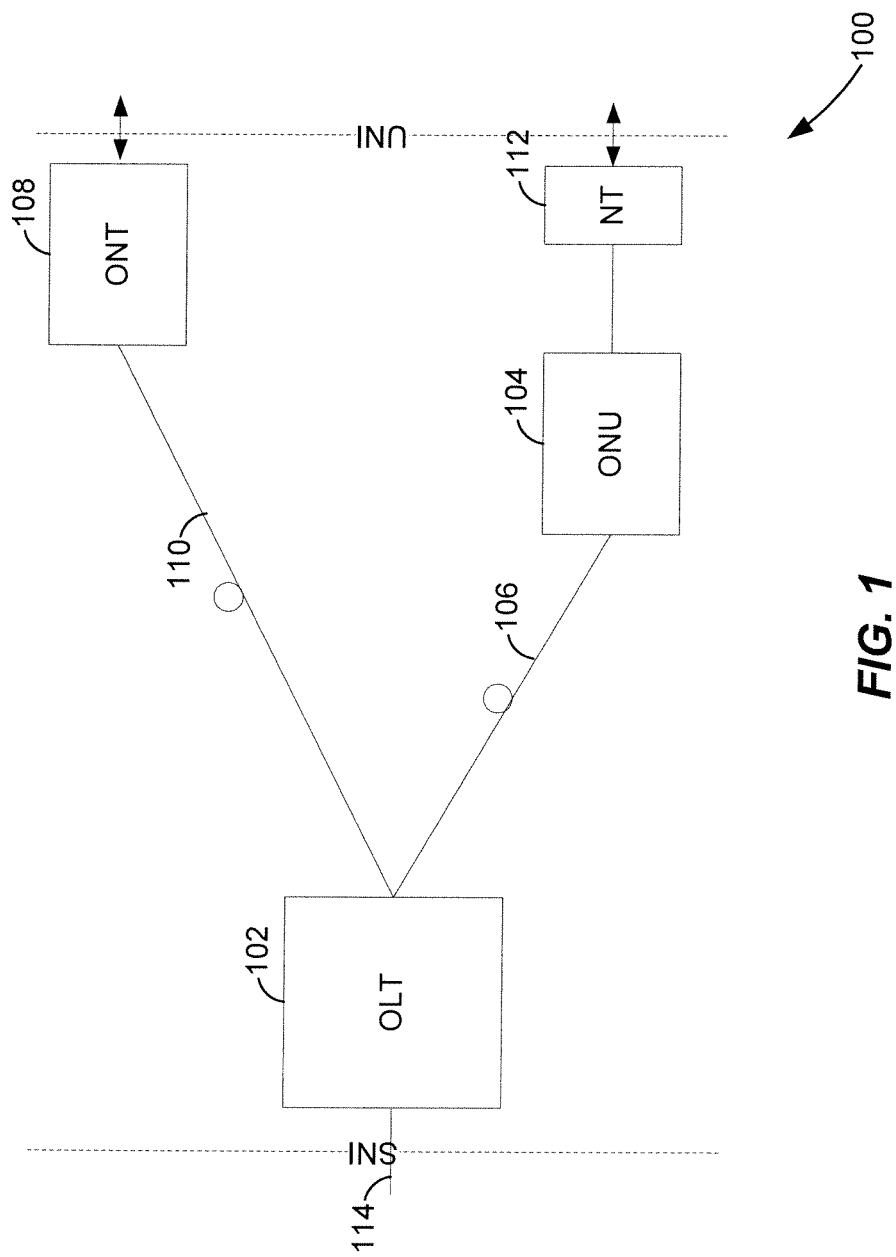
FIG. 1 a block diagram of a passive optical network.

FIG. 1 shows an example GPON configuration 100 with an OLT 102 communicatively coupled to a backbone network as a service node interface (SNI) such as at a provider of interne services, television services, telephony services, or other network services provider. Typical backbone interfaces include time division multiplexed (TDM) interfaces, such as SONET/SDH or PDH, and Gigabit and 100 Mbit/s Ethernets. The OLT 102 is communicatively coupled to an ONU 104 through optical fiber 106 and to an ONT 108 through another optical fiber 110, with both the ONT 108 and the ONU 104 being at a user network interface end of the configuration 100. The ONU 104 and the ONT 108 may operate under an ATM mode, GPON encapsulation method (GEM) mode, or Dual mode, in typical examples. While this disclosure refers to both ONUs (e.g., 104) and ONTs (e.g., 108), it should be understood that in the context of this disclosure, ONTs and ONUs may be treated similarly and these terms may be considered interchangeable. For convenience sake, at times, the teen "network termination device" will be used herein to refer to devices that could be either an ONT or an ONU.

As would be understood by persons of ordinary skill in the art, typically, the GPON system 100 would operate at rates of 1.244 and 2.488 Gbit/s downstream and 155 Mbit/s, 622 Mbit/s, 1.244 Gbit/s, and 2.488 Gbit/s upstream.

Although only a single ONU 104 and a single ONT 108 are shown, it should be understood that in a point-to-multipoint optical network, the optical fibers 106 and 110 may each run, one-to-one from the OLT 102 to an ONU 104 and ONT 108 where there may be multiple ONUs and ONTs in a passive optical network, each of which may in turn service end users. Additionally, while single fibers 106 and 110 are shown, in will be understood that passive optical components, such as optical splitters, may be used to branch fibers for connecting to multiple ONUs/ONTs. In the illustrated example, the ONT 108 may refer to an integrated unit for an end user that presents services of the service provider to the end user (e.g., video, data, telephony, etc.). While the ONU 104 may be an optoelectronic interface to network termination (NT) 112, where the ONU 104 terminates the passive optical network and the NT 112 provides the services to the end user. The ONU 104 handles data packet conversion between the passive optical network and the NT 112.

Generally, the OLT 102 provides downstream broadcasts to each of the ONTs 108 and each of the ONUs 104 on different dedicated one-to-one fibers, where each ONT 108 and/or ONU 104 individually reads only the content of the transmissions intended for the particular ONT 108 and/or ONU 104. The ONTs 108 and the ONUs 104 provide upstream transmissions to the OLT 102 via their individual fibers. Communications between the OLT 102 and the ONT 108 or ONU 104 generally utilize wavelength division multiplexing with the downstream broadcasts utilizing one wavelength and upstream transmissions utilizing another wavelength. In some examples, the optical fibers 106 and 110 may be compliant with the ITU G.652 standard and support downstream wavelengths between 1480-1500 nm and upstream wavelengths between 1260-1360 nm. For two-fiber downstream systems, the downstream wavelengths may be 1260-1360 nm. Of course, the passive optical networks herein are not limited to a particular wavelength range on downstream or upstream communication. Furthermore, although the passive optical network configuration 100 is described as having one-to-one fibers between the OLT 102 and the ONTs/ONUs 108, 104, it should be understood that multiple fibers may be utilized in the one-to-one correspondence between the OLT 102 and each corresponding ONT/ONU 108, 104. In one example, each connection between the OLT 102 and the ONTs/ONUs 108, 104 may utilize two fibers, with one for upstream transmissions and one for downstream transmission, rather than wavelength division multiplexing signals that share the same fiber.

The OLT 102 provides a variety of functions within the passive optical network 100. At one level, the OLT 102 provides the interface 114 between the passive optical network 100 and a backbone network of the service provider network, which may include supporting time division multiplexed (TDM) protocols at different rates of speed, internet protocol (IP) traffic, asynchronous transfer mode (ATM) protocols, etc. The OLT 102 further facilitates both upstream and downstream communication between the service provider and the ONTs 108 and ONUs 104, and between ONTs 108 and ONUs 104. For example, the OLT 102 allocates upstream bandwidth to the ONTs 108 and ONUs 104 by granting intervals of time (e.g., time slot assignments) to each of the ONTs 108 and ONUs 104 to transmit upstream communications without collisions on the fiber. Upstream bandwidth allocation may be fixed for ONTs 108 or ONUs 104 requiring continuous (e.g., guaranteed) bandwidth availability. For ONTs 108 or ONUs 104 that do not require continuous bandwidth availability (e.g., burst transmissions), the OLT 102 may utilize dynamic bandwidth allocation (DBA) based on either polling bandwidth information from the ONTs 108 and ONUs 104 or based on the occurrence of idle gigabit passive optical network (GPON) encapsulation method (GEM) frames from the ONTs 108 or ONUs 104. In addition, the ONTs 108 and ONUs 104 are typically provided at different distances from the OLT 102, and the OLT 102 utilizes a ranging protocol to equalize the optical path length and equalize the transmission delay between the OLT 102 and the various ONTs 108 and ONUs 104. For example, the OLT 102 may measure the transmission delay for each ONT 108 and ONU 104, and transmits a physical layer operations and maintenance (PLOAM) message to set the transmission delay in the ONT 108 or ONU 104. The OLT 102 further provides centralized media access control (MAC) for the passive optical network 100 for purposes of upstream bandwidth allocation.

Upstream and downstream transmissions between the OLT 102 and the ONTs 108 or ONUs 104 may be performed in a transmission convergence frame format, whereby the transmission data, regardless of the services being provided, is encapsulated in the same type of data packet for transmission over the passive optical network 100. In particular, the transmissions between the OLT 102 and the ONTs 108 or ONUs 104 may take advantage of the gigabit passive optical network (GPON) standard developed by the International Telecommunications Union (ITU). The GPON standard is also known as ITU-T G.984. As is known, the GPON standard generally provides greater security as compared to previous standards, greater bandwidth, larger variable-width data packets, higher data rates and supports various Layer 2 protocols including ATM, Ethernet and GEM.

Although the disclosure generally refers to a GPON, it should be understood that all or part of this disclosure may be equally applicable to, or supportive of, previous-generation passive optical network standards, such as asynchronous transfer mode (ATM) passive optical network (APON) and broadband passive optical network (BPON), current passive optical network standards, such as Ethernet passive optical network (EPON), and future passive optical network standards, such as wavelength division multiplex passive optical network (WDM-PON). The disclosure may also be equally applicable to variations on the GPON standard.

In operation, the OLT 102 initially executes an activation protocol to add network devices, i.e., ONUS, ONTs, and end user devices. This protocol is important for ranging each of the ONUs/ONTs, of which there may be hundreds for a given OLT, to deter imine how far each is physically spaced from the OLT/office. The activation protocol may ensure that every single ONU/ONT is treated, temporally speaking, as having the same distance from OLT for synchronous communication at the OLT.

As part of the activation protocol, GPON system 100 uses a full digital in-band based activation method to measure the logical distances between the ONU 104 and ONT 108 and the OLT 102. Once the ONU 104 and ONT 108 are ranged, they become operational on the GPON system 100. As noted above, the maximum range of the GPON 100 is at least 20 km. Furthermore, the transmission delay measurement for each ONU 104/ONT 108 may be performed while the GPON 100 is in-service and without disrupting service to other ONUs/ONTs (not shown). Further, when ranging the ONU 104/ONT 108, any working ONUs/ONTs must temporarily stop transmission, thereby opening a ranging window. Information about the position of the ONU 104/ONT 108 can minimize this ranging window, but for ONUs/ONTs that have not been previously ranged, the duration is determined according to the maximum differential range of the GPON system 100. For example, the network operator may provide the GPON system 100 with a prior minimum and maximum OLT_ONU (or OLT_ONT) distance as information regarding likely or actual unit position. In other examples, a default distance range is set from 0 km minimum to 20 Km maximum. For ONUs/ONTs that have not been previously ranged, the start and end of the ranging window may be determined from these provisioned minimum and maximum distances.

Generally speaking, the GPON system 100 uses two methods for installing the ONU/ONT 104, 108. First, the serial number of the ONU/ONT 104, 108 is registered at the OLT 102 in advance by the OpS system. Second, the serial number of the ONU/ONT 104, 108 is not registered at the OLT 102 by the OpS system, but instead an automatic detection mechanism is performed to determine the serial number of the ONU/ONT 104, 108, and when a new ONU/ONT 104, 108 is detected without a serial number, an ONU-ID (or ONT-ID) is assigned and unit activated.

Figure 2:
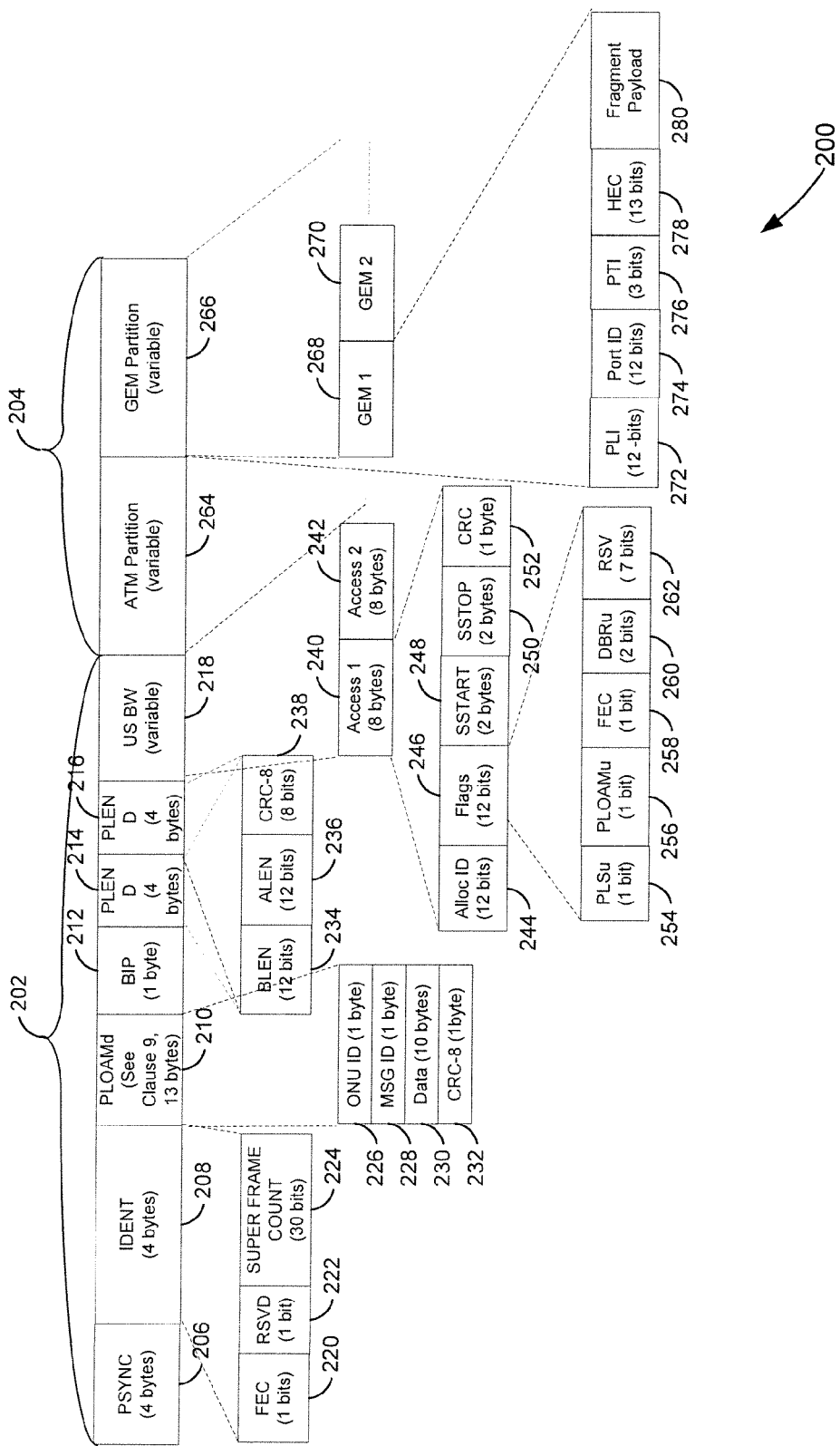
FIG. 2 is a schematic diagram of a downstream gigabit passive optical network transmission convergence frame format.

FIG. 2 is an example of a downstream transmission convergence layer (TC-Layer) frame format 200 using the GPON standard and which may be utilized for downstream transmissions from the OLT 102 to the ONTs 108 and ONUs 104. The downstream frame format 200 generally includes an overhead field 202 and a payload field 204, where the overhead field 202 includes several sub-fields to be assembled by the OLT 102 and the payload field 204 includes the information being sent to the ONT 108 or ONU 104 (e.g., service data). As indicated above, the data for the payload field 204 may be provided in one or more transport formats, such as ATM or GEM, and as a variable length data packet. As also indicated above, while the following disclosure involves an example of the downstream transmission convergence layer (TC-Layer) frame format 200, as well as the subsequent upstream transmission convergence layer (TC-Layer) frame format discussed further below, it should be understood that variations of the downstream and upstream formats may occur and the disclosure is not limited to the particular examples given herein.

The overhead field 202 for the downstream transmission frame may be referred to as the physical control block downstream (PCBd), and may include a physical synchronization (PSYNC) field 206, an identification (Ident) field 208, a physical layer operations and maintenance downstream (PLOAMd) field 210, a bit interleaved parity (BIP) field 212, a first payload length downstream (Plend) field 214, a second Plend field 216, and an upstream bandwidth map (US BWmap) field 218. The PSYNC field 206 is a fixed pattern that generally begins the overhead field 202, such that an ONT or ONU may use the PSYNC field 206 to identify the beginning of the frame 200 and establish synchronization with the downstream transmission. When the ONT 104 or ONU 106 finds the PSYNC field 206 within a frame of a downstream transmission from the OLT 102, the ONT/ONU 108, 104 may utilize a synchronization state machine, or other synchronization method, and search for other PSYNC fields 206 within subsequent frames to establish and monitor the synchronization state with the transmission. In one example, a counter may be set upon identifying an unique value in the PSYNC field 206, with the counter being incremented for each valid PSYNC field 206 read by the ONT/ONU 108, 104. Once the counter reaches a predetermined threshold, the ONT/ONU 108, 104 is able to enter into a synchronization state whereby the ONT/ONU 108, 104 is in synchronization with the downstream transmission rate. The ONT/ONU 108, 104 may thereby determine it has discovered the downstream frame structure and begin to process the overhead information. The ONT/ONU 108, 104 may also maintain a count for invalid or incorrect PSYNC fields 206, and if the incorrect count reaches a predetermined threshold, the ONT/ONU 108, 104 may determine that it has lost the downstream frame structure and repeat the search for a valid or correct PSYNC field 206. However, it should be understood that different state machines or different manners of establishing and monitoring synchronization with the transmission may be utilized.

The Ident field 208 may be used to indicate large frame structures (superframes) within the downstream transmission frame, and which may be used to control data encryption and to provide lower rate synchronization reference signals. Generally, the Ident field 208 includes an FEC field 220, a reserved field 222 and a superframe counter 224. The FEC field 220 indicates whether forward error correction (FEC) is being enabled on the present downstream frame and may be used for FEC control. As is known, forward error correction is a method of error control for transmissions, where the OLT 102 may add redundant data to the downstream transmission frame, and the ONT/ONU 108, 104 may detect and correct errors using the redundant data, thereby avoiding retransmission of the downstream transmission frame from the OLT 102. The reserved field 222 is reserved for other purposes, and the superframe counter 224 provides error checking for potential dropped frames. The ONT/ONU 108, 104 loads the superframe counter value and compares its local expected value with the superframe counter value, whereby a match indicates correct synchronization and a mismatch indicates a transmission error or desynchronization.

The PLOAMd field 210 contains a downstream PLOAM message from the OLT 102 for the ONT/ONU 108, 104. A PLOAM message is generally a control message that may relate to a variety of information or instructions for the ONT/ONU 108, 104, including, but not limited to, alerts, activation-related messages, instructions, etc. For example, an Upstream_Overhead PLOAM message may instruct the ONT/ONU 108, 104 to use a particular preassigned equalization delay during ranging and number of preamble bytes for upstream transmissions, defined the transmission power of the ONT/ONU 108, 104 and the number of serial number transmissions per serial number request. A Serial_number_mask PLOAM message may provide a serial number and a mask for part of the serial number. An Assign_ONU-ID PLOAM message may assign an identification with the serial number of the ONT/ONU 108, 104. A Ranging_Time PLOAM message may provide a value for an equalization delay register of the ONT/ONU 108, 104. A Deactivate_ONU-ID PLOAM message may provide a deactivation/reset instruction to stop sending upstream transmissions. A Disable_serial_number PLOAM message may provide a disable/enable instruction to an ONT/ONU 108, 104. A Configure_VP/VC PLOAM message may activate or deactivate a virtual channel or a virtual path at the ATM layer. An Encrypted_Port-ID/VPI PLOAM message may indicate encrypted and unencrypted channels to the ONT/ONU. A Request_password PLOAM message may request a password from the ONT/ONU for verification. An Assign_Alloc-ID PLOAM message may assign an allocation identification to an ONT/ONU 108, 104. A POPUP PLOAM message may instruct the ONT/ONU 108, 104 to move to a ranging state or an operation state. A Request_Key PLOAM message may trigger the ONT/ONU 108, 104 to generate a new encryption key. A Configure Port-ID PLOAM message may link a management and control interface of the ONT/ONU 108, 104 (OMCI) with a Port-ID which may be appended to an overhead of GEM encapsulated payload to be used as an addressing mechanism to route the OMCI over the GEM channel. A PEE-Physical Equipment Error PLOAM message to indicate that the OLT is unable to sent both ATM cells, GEM frames and ONT/ONU Management and Control Channel (OMCC). A Change-Power-Level PLOAM message may trigger the ONT/ONU 108, 104 to increase or decrease it transmission power level. A PST (PON Section Trace) PLOAM message may be provided to check the connectivity between the ONT/ONU 108, 104 and the OLT, and to perform Automatic Protective Switching (APS). A BER interval PLOAM message may be provided to define the accumulation interval per ONT/ONU 108, 104 expressed as a number of downstream frames for the ONT/ONU 108, 104 counting the number of downstream bit errors. A Key Switching Time PLOAM message may indicate when the ONT/ONU 108, 104 when to begin using a new encryption key.

As seen in FIG. 2, the PLOAMd field 210 is formatted to include an ONU ID 226, a Message-ID 228, the message Data 230 and a cyclic redundancy check (CRC) 232. The ONU ID 226 identifies the ONT/ONU 108, 104 to receive the PLOAM message. The Message-ID 228 identifies the type of PLOAM message, example of which are provided above. The message Data 230 are used for the payload of the PLOAM message. The CRC 232 is a frame check sequence, such that the PLOAM message may be discarded upon receipt if the CRC is incorrect.

The BIP field 212 contains the bit interleaved parity of the bytes that have been transmitted since the previous BIP. The ONT/ONU 108, 104 independently determines the BIP and compares the result to the BIP field 212 to measure the number of errors in the transmission.

The Plend field 214, 216 specifies the length of the bandwidth map (BWmap) (also referred to as the bandwidth allocation) and any ATM partition in the payload 202. The BWmap length is provided in a Blen field 234, and the ATM partition length related information is provided in a Alen field 236. As seen in FIG. 2, the Plend field 214, 216 is a redundant field for error robustness. The Plend field 214, 216 may be protected by CRC (e.g., CRC-8) for error detection and correction as provide in a CRC field 238. In particular, the length of the bandwidth map provides the limit of the number of allocation IDs that may be granted in any particular duration in any 125 microsecond duration up to 4095. The actual length of the BWmap field 218 is then 8 times the Blen value. The Alen field 236 may allow up to a particular number of ATM cells in a frame (e.g., a 12-bit Alen field allows 4095 ATM cells), up to a particular data rate (e.g., 10 Gbits/s). The length of the ATM partition is then 53 times Alen. The ONT/ONU 108, 104 implements the error detection and correcting functions of the CRC field 238, decodes both copies of the Plend field 214, 216 and uses the copy based upon the result of the CRC detection process (e.g., the copy that is error free or that has a correctable error).

In the illustrated example, the downstream frame format overhead field 202 would have a byte length of 46 bytes and up to 32,814 bytes, depending on the length of the BWmap field 218, as provided in the Blen field 234.

The US BWmap field 218 provides an upstream bandwidth allocation as processed by the OLT acting as the main or central controller for the ONTs 108 and ONUS 104. The BWmap field is provided as an array of allocation structures 240, 242 (Access 1, Access 2, etc.), where each entry in the array represents a single bandwidth allocation to a particular transmission container (T-CON). The number of entries in the BW map is provided in the Plend field 214, 216. The access fields are distributed to the ONTs/ONUs 108. 104 which become slaves to the OLT and are required to follow the provided format.

As shown in FIG. 2, each allocation structure 240, 242 (only one is shown in detail) includes an Alloc ID field 244, a Flags field 246, a SSTART field 248, a SSTOP field 250 and a CRC field 252. The Alloc ID field 244 indicated the particular T-CONT that is being granted time on the upstream, and includes an address of the ONT/ONU 108, 104 receiving the T-CONT.

The Flags field 246 contains five separate indications on how the allocation should be used by the ONT/ONU 108, 104, including information to be sent back to the OLT 102 during the bandwidth allocation provided to the ONT/ONU 108, 104. The Flags field 246 includes a PLSu field 254, a PLOAMu field 256, an FEC field 258, a DBRu field 260 and an RSV field 262. The PLSu field 254 is a power leveling sequence used for power control measurements by the ONT/ONU 108, 104 which, if set, directs the ONT/ONU 108, 104 to send its PLSu information during the bandwidth associated allocation. If the PLSu bit is not set, the ONT/ONU 108, 104 does not send its PLSu information for the associated bandwidth allocation. The power control measurements function allows for adjustment of the power levels of the ONT/ONU 108, 104 to reduce the optical dynamic range as seen by the OLT 102, and is useful in initial power set-up of the ONT/ONU (e.g., during activation), and power mode change of the ONT/ONU 108, 104 transmitter (e.g., during activation or operation). The PLOAMu field 256 directs the ONT/ONU 108, 104 to send its PLOAMu information during the associated bandwidth allocation, if the bit is set. Examples of the PLOAM messages are discussed above. The FEC field 258 causes the ONT/ONU 108, 104 to compute and insert an FEC parity during the associated bandwidth allocation, if the bit is set. The DBRu field 260 causes the ONT/ONU 108, 104 to send an upstream Dynamic Bandwidth Report indicating the number of cells or blocks in the T-CONT buffer of the ONT/ONU 108, 104, whereby the OLT 102 may determine the congestion status of each T-CONT. The RSV field 262 is reserved for future use.

The SSTART field 248 is the start time field indicating the starting time for upstream transmission (i.e., the starting time of the bandwidth allocation). The SSTOP field 250 is the stop time field indication the stop time for the upstream transmission. Each ONT/ONU 108, 104 uses the SSTART and SSTOP fields 248, 250 to determine when to start and stop its upstream transmission. Each ONT/ONU 108, 104 identifies which particular information among the allocation structures is for its own use as filtered through the Allocation ID 244 bits within the access portion of the frame. The CRC field 252 is a cyclic redundancy check (e.g., CRC-8) that protects each allocation structure, and where the ONT/ONU 108, 104 of the BWmap field 218 processing implements error detecting and correcting functions of the CRC. If an uncorrectable error occurs as indicated by the CRC function, the allocation structure is discarded.

The transmission convergence payload field 204 may include both an ATM payload field 264 or partition, and a GEM payload field 266 or partition. As such, a variety of user data type may be carried in the GPON transmission convergence payload. The ATM partition 264 may contain a number of ATM cells, the length of which is provided in the Plend/Alen fields 214/236, 216/236. The OLT 102 may allocate as many cell durations as needed in the downstream, including almost all of the downstream frame. Generally, the ATM partition 264 is an integer multiple of 53 bytes long based upon the Plend/Alen fields 214/236, 216/236, and the ATM cells are aligned to the partition. The downstream cell stream is filtered at the ONT/ONU 108, 104 based upon a virtual path identifier (VPI) or virtual channel identifier (VCI). In particular, each ONT/ONU 108, 104 is configured to recognize which VPI belongs to it, and ATM cells that belong to the ONT/ONU 108, 104 are passed on to the ATM client process.

The GEM partition 266 contains a variable number of GEM frame-mode delineated frames 268, 270 (GEM1, GEM2, etc.). The length of the GEM partition 266 is determined based on whatever remains after the overhead 202 and ATM partitions 264 are subtracted from the overall frame length. The GEM protocol provides delineation of the user data frame (either going to or coming from a user) and provides port identification for multiplexing. Delineation and port identification are accomplished by the GEM header discussed below. The delineation process uses the GEM header at the beginning of every downstream GEM partition and every upstream GEM payload. As such, in a downstream transmission the ONT/ONU 108, 104 is assured of finding the first header and may find subsequent headers using the payload length identifier (PLI) as a pointer.

As seen in FIG. 2, each GEM frame 268, 270 includes a header containing a PLI field 272, a Port-ID field 274, a PTI field 276, HEC field 278, and a fragment payload 280. The PLI field 272 indicates the length of the fragment payload 280 following the header, and is used to identify the next header in the GEM stream to provide delineation. The size of the PLI field 272 (e.g., 12-bits) determines the size of the GEM fragments (e.g., up to 4095 bytes), where data frames larger than the GEM fragment payload size are fragmented into smaller sizes to accommodate the GEM fragment payload size. The Port-ID field 274 is an unique traffic identifier on the passive optical network 100 to provide traffic multiplexing. The PTI field 276 indicates the content type of the fragment payload 280 and how the fragment payload 280 should be treated (e.g., user data fragment; congestion has or has not occurred; end or not end of a frame). The PTI field 276 may be similar to that used in the ATM header. The PTI field 276 indicates which fragment contains the end of the user data frame. The downstream frame transmission is filtered at the ONT/ONU 108, 104 based upon the Port-ID field 274 contained in each GEM fragment. Frames belonging to the ONT/ONU 108, 104, each of which are configured to recognize which Port-IDs belong to it, are passed on to the GEM client process.

The HEC field 278 is header error control which provides error detection and correction functions for the GEM header. The GEM header may be provided at the beginning of each downstream GEM payload and the ONT/ONU 108, 104 uses the PLI field 272 to find the first header, and finds subsequent headers using the PLI as a pointer. The ONT/ONU 108, 104 may thereby transition to the "sync" state at the beginning of each partition and payload. If uncorrectable errors occur in the header as determined based on the HEC field 278, delineation of the GEM partition may lose synchronization with the data stream, and the ONT/ONU 108, 104 attempts to reacquire synchronization. The ONT/ONU 108, 104 searches for a GEM header HEC field 278, and when one is found, the ONT/ONU 108, 104 transitions to a pre-synchronized state, where it looks for the HEC field 278 at the location indicated in the previously found header. If the HEC matches, then the transition is made to the synchronized state. If it does not match, then the transition is made to the search for another HEC.

Figure 3:
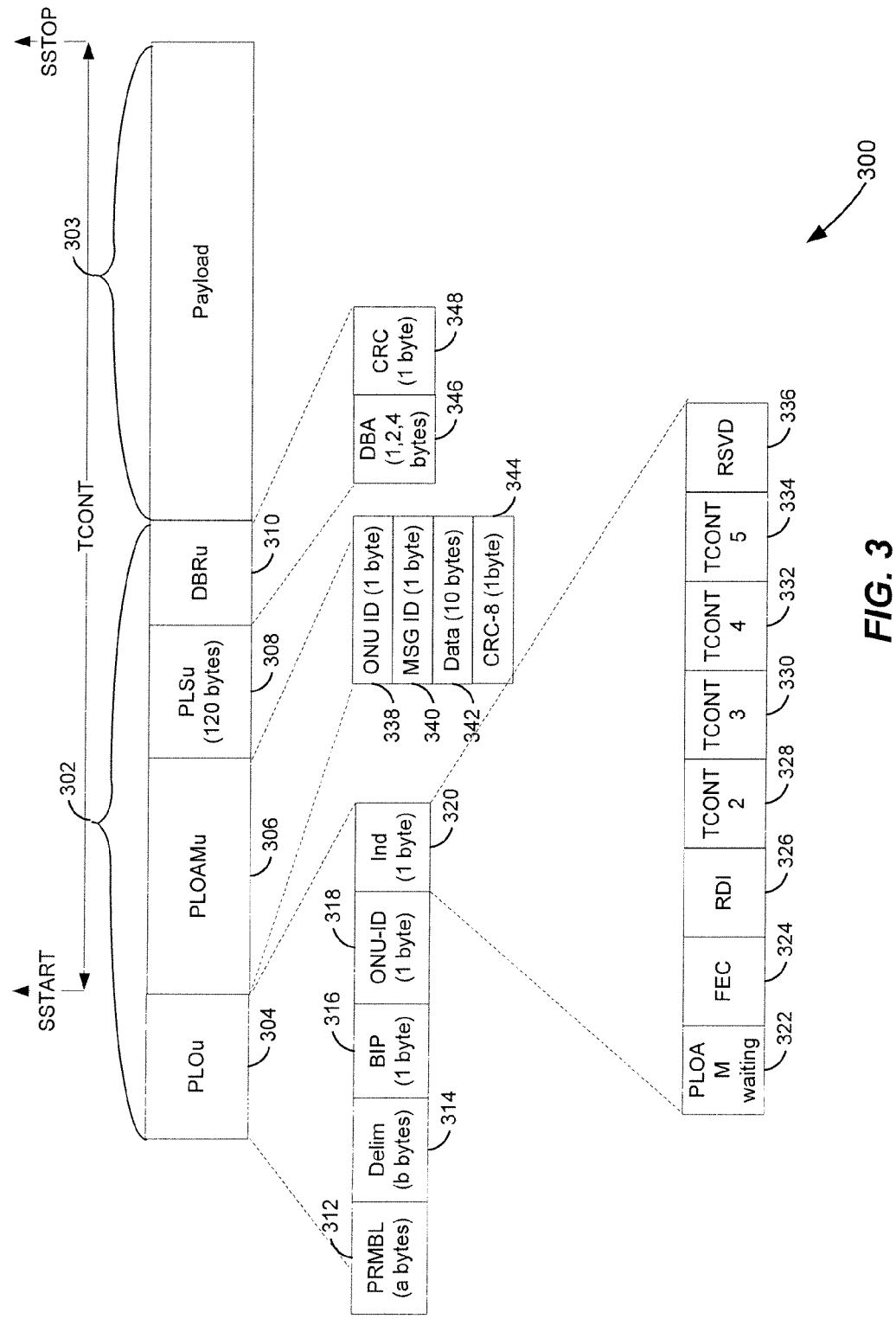
FIG. 3 is a schematic diagram of an upstream gigabit passive optical network transmission convergence frame format.

FIG. 3 is an example of an upstream transmission convergence layer (TC-Layer) frame format 300 using the GPON standard and which may be utilized for upstream transmissions from the ONTs 108 and/or ONUs 104 to the OLT 102. The upstream frame format 300 generally includes an overhead field 302 and a payload field 303. The overhead field 302 includes several sub-fields to be assembled by the ONT/ONU and processed by the OLT 102 and the payload field 303 includes the information being sent to the OLT 102 or to the service provider network. As indicated above, the data for the payload field 303 may be provided in one or more transport formats, such as ATM or GEM, and as a variable length data packet. The frame length of the upstream transmission convergence layer (TC-Layer) frame format 300 may be the same as that of the downstream transmission convergence layer (TC-Layer) frame format 200 for all transmission rates. Each frame may contain a number of transmissions from one or more ONTs/ONUs 108, 104, where the BWmap defines the arrangement of the transmissions. As seen in FIG. 3, the T-CONT of the upstream message is defined by the start and stop transmission times (SSTART and SSTOP) as determined by the OLT 102 during the downstream transmission, but does not include the PLOu field which is sent immediately prior to the start time pointer SSTART.

The overhead field 302 for the upstream transmission frame may include various types of overheads, including physical layer overhead (PLOu) 304, physical layer operations and management upstream (PLOAMu) 306, power leveling sequence upstream (PLSu) 308 and dynamic bandwidth report upstream (DBRu) 310. As discussed above, the Flag field 246 in the downstream transmission assembled by the OLT 102 indicates whether PLOAMu, PLSu or DBRu information should be sent from the ONT/ONU 108, 104 on each bandwidth allocation. The upstream frame is generally scrambled, and may be scrambled using a frame-synchronous scrambling polynomial.

The PLOu field 304 includes the physical layer overhead, which is provided as a preamble (PRMBL) field 312 and a delimiter (Delim) field 314. Three additional fields of data corresponding to the ONT/ONU 108, 104 as a whole are also provided: a bit interleaved parity (BIP) field 316, a ONT/ONU 108, 104 identification (ONU-ID) field 318 and an indication (Ind) field 320. The above data is generally provided at the beginning on any transmission burst from an ONT/ONU 108, 104. The status of the PLOu information is given by the arrangement of the bandwidth allocations. Every time an ONT/ONU 108, 104 takes over the passive optical network 100 from another ONT/ONU 108, 104, the ONT/ONU 108, 104 sends a new copy of the PLOu data. The GPON transmission convergence layer sources the PLOu 304. The preamble field 312 is used to synchronize the OLT 102 to the incoming message, and the delimiter field 314 is used by the OLT 102 to identify where the first bit of important information in the frame begins. The preamble field 312 and the delimiter field 314 are formed as determined by the OLT 102 in the Upstream_Overhead PLOAM message discussed above. As seen in FIG. 3, the preamble and delimiter fields 312, 314 are transmitted before the allocation start time SSTART pointer, as previously dictated by the OLT 102.

The BIP field 316 contains the bit interleaved parity of the bytes transmitted since the last BIP from the transmitting ONT/ONU 108, 104, excluding those of the preamble and delimiter fields 312, 314. The OLT 102 computes the bit-interleaved parity for each ONT/ONU 108, 104 burst, and compares the result to the BIP of the BIP field 316 to measure the number of errors in the link. The ONU-ID field 318 contain the unique identification of the transmitting ONT/ONU 108, 104. The ONU-ID is generally assigned to the ONT/ONU 108, 104 during the ranging process.

The Ind field 320 provide a real-time ONT/ONU status report to the OLT. As shown in FIG. 3, the format of the Ind field 320 is provided as a PLOAM waiting field 322 indicating if one or more PLOAM messages are waiting, an FEC field 324 indicating if forward error correction is enabled or not, a remote defect indication (RDI) field 326 indicating if a defect occurred or not, traffic waiting indicator fields for type 2 T-CONTs 328, type 3 T-CONTs 330, type 4 T-CONTs 332 and type 5 T-CONTs 334, as well as reserved bits 336. If the PLOAM waiting field 322 indicated an urgent PLOAM message is waiting, the OLT 102 may issue an upstream allocation that allows the ONT/ONU 108, 104 to send the PLOAM message in a timely manner. Further uses of the Ind field 320, and in particular the T-CONT fields 328, 330, 332, 334, are discussed below in relation to the DBRu field 310.

Examples of the PLOAM messages as provided in the PLOAMu field 306 are discussed above, and may be provided by the transmitting ONT/ONU 108, 104 in response to a corresponding request from the OLT 102. In particular, the PLOAMu field 306 may only be sent when indicated by the Flags field 246. The PLOAMu field 306 may have a similar structure as the PLOAMd field 210, including an ONU ID 338 of the transmitting ONT/ONU 108, 104, a Message-ID 340 identifying the type of PLOAM message, the message Data 342 for the payload of the message, and a cyclic redundancy check (CRC) 344 to detect and correct errors in the header fields 338, 340, 342.

The PLSu field 308 is used for power control measurements by the ONT/ONU and adjusts the ONT/ONU 108, 104 power levels to reduce the optical dynamic range seen by the OLT. The content of the PLSu field 308 is generally set by the ONT/ONU, and is sent by the ONT/ONU 108, 104 when indicated in the Flags field 246 of an downstream transmission from the OLT 102. For example, the OLT 102 may set the PLSu bit on broadcast allocation to allow the ONT/ONU 108, 104 to use set up its transmitter during the activation process. If the ONT/ONU 108, 104 does not use the PLSu field 308, the ONT/ONU 108, 104 may deactivate its transmitter for that time. During operation of the ONT/ONU 108, 104, the ONT/ONU 108, 104 generally transmits following the PLSu field 308, such that the ONT/ONU 108, 104 sends the PLSu field 308 when it is requested by the OLT 102 regardless of any need to perform transmitter adjustment.

The DBRu field 310 includes information that is associated with the T-CONT entity, rather than the ONT/ONU 108, 104. The DBRu field 310 is sent when requested by the OLT 102 in the Flags field 246 of a downstream transmission. The DBRu field 310 includes a dynamic bandwidth allocation (DBA) field 346 and a CRC field 348. The DBA field 346 contains the traffic status of the particular T-CONT, and may be used by the OLT 102 for bandwidth allocation for the ONT/ONU 108, 104. DBA may be supported via status reporting and OLT traffic monitoring for those ONTs/ONUs 108, 104 that do not report status. Status reporting DBA may be provided as status indications in the PLOu, in the DBRu as shown in FIG. 3, or in an ONU report in a DBA payload.

Status indications may be carried as four bits in the PLOu Ind field 320, and provide a report for each type of T-CONT 328, 330, 332, 334. Each bit may correspond to a different T-CONT type. If a bit is set for a particular T-CONT type 328, 330, 332, 334, the OLT 102 may assume there is some data waiting in one of the T-CONT buffers of that type. It is noted that T-CONT types 2, 3 and 4 328, 330, 332 may not have a fixed bandwidth component and any data waiting in those T-CONTs 328, 330, 332 causes the corresponding indicator to be set, whereas a T-CONT type 5 field 334 buffer may contain data belonging to a fixed bandwidth such that the presence of non-fixed bandwidth sets the corresponding indicator. The status indications provide an early warning to the OLT 102 that data is waiting, though it is not required that the OLT 102 DBA algorithm wait for such indications before allocating bandwidth to the ONT/ONU 108, 104 in order to avoid unnecessary delays. The OLT 102 may use the status indications for a fast alert that DBA supervision may be needed at the ONT/ONU 108, 104 without identifying the T-CONT 328, 330, 332, 334 or bandwidth detail.

Status reporting DBA in the DBRu field 310, shown in FIG. 3 as the DBA field 346, provides a continuous update of the traffic status of a particular T-CONT and is carried in the DBRu field 310 associated with the T-CONT. The status report in the DBA field 346 specifies the amount of data waiting in the T-CONT buffer corresponding to the allocation identification (Alloc-ID) that triggered the DBRu transmission. The OLT 102 may trigger the transmission of the DBRu by setting the DBRu field 260 in the Flags field 246 of a downstream transmission. The CRC field 348 protects the report in the DBA field 346 and DBRu structure with error correction and detection. The OLT may implement the error detecting and correcting functions associated with the CRC field 348 (e.g., CRC-8). If the CRC function indicates an uncorrectable error, the information in the DBRu field 310 may be discarded.

An ONU report in a DBA payload allows for the ONT/ONU 108, 104 to send a DBA report on any T-CONT in the transmission, and is carried in a dedicated DBA payload partition allocated by the OLT in the upstream. The ONT/ONU 108, 104 may select the T-CONT that is the subject of the report, and allows the OLT 102 to schedule a DBA payload which is generally smaller that that required to report on all the T-CONTs in the ONT/ONU 108, 104.

The upstream payload field 303 may be used to carry ATM cells, GEM-delineated frames or DBA reports. The ATM upstream payload includes a number of ATM cells from the ONT/ONU to the OLT 102, and the length of the payload is given by the duration of the allocation minus the size of any requested overhead. The ONT/ONU 108, 104 may buffer the ATM cells as they are provided by the OLT 102 and send them in burst during the allocated time. The OLT 102 receives the ATM cells, and may multiplex them with other bursts from other ONTs/ONUs 108, 104 and pass them to the OLT ATM client. The GEM payload contains any number of GEM frame-mode delineated frames, and the length of the payload is also given by the duration of the allocation minus the size of any requested overhead. The GEM protocol provides delineation of the user data frame (either going to or coming from a user) and provides port identification for multiplexing. As discussed above, delineation and port identification are accomplished by a GEM header, where the delineation process uses the GEM header at the beginning of every upstream GEM payload. As such, in an upstream transmission the OLT 102 is assured of finding the first header and may find subsequent headers using the PLI as a pointer. The DBA payload is discussed above, and contains a group of dynamic bandwidth allocation reports from the ONT/ONU 108, 104.

Figure 4A:
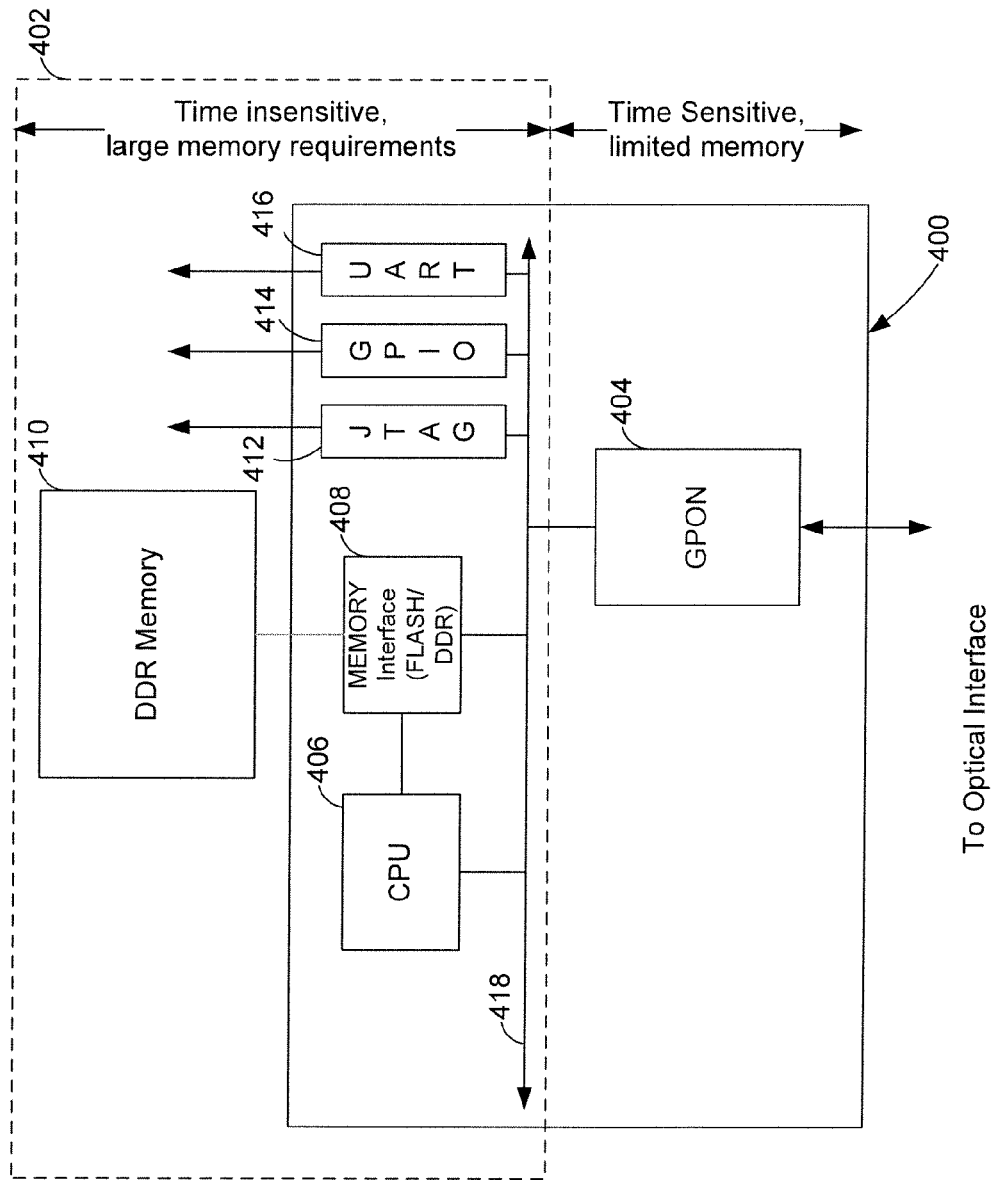
FIG. 4A is a high level block diagram of an example architecture of an integrated circuit within a passive optical network device, such as may be used for an optical line termination device, optical network unit device, or an optical network termination device.

FIG. 4A is a block diagram indicating an example of an architecture 400 that may be implemented in an ONU or ONT, such as those shown in FIG. 1 to divide and execute time sensitive functions from non-time sensitive functions. Generally, the architecture 400 includes a sub-system 402 that may be used to execute non-time sensitive functions, such as those that require large memory requirements or low latency, and integrated circuits 404 having an embedded processor for performing time-sensitive functions, such as those that may only need limited memory. Time-sensitive versus non-time sensitive functions may be determined based on time threshold or response threshold requirements for processing the functions. For example, some functions, such as Media Access Control (MAC), may require immediate response (i.e., fast response threshold, time sensitive), whereas other functions, such as TCP/IP routing or packet processing, may not require an immediate response (i.e., non-time sensitive). It is recognized that in practice the actual response time for some non-time sensitive functions may be comparable to the response time threshold of time-sensitive functions. However, it should be understood that it is the response time requirements (e.g., time threshold requirements) that establish whether a function is time-sensitive or not, rather than the actual response time seen in practice. As such, the time threshold requirements delineating between time-sensitive and non-time sensitive are not necessarily predetermined or static, but are rather based on the allowable response time for executing the function. The integrated circuit 404 is described in example implementations further below and it is noted that the memory storage on the circuit may be achieved entirely by small memory modules, such as first in first out (FIFO) memory buffers, and of sufficient size to store packet data as it is received.

As will be apparent from the discussions below in regards to FIGS. 5A-5D, the integrated circuit 404 may perform a variety of time-sensitive functions depending on the information received at a receiver end of the circuit 404 and the information to be transmitted from a transmitter end thereof. In a GPON context, for example, these functions may include processing of various subfields in overhead data in a received transmission. The integrated circuit may pre-process these subfields prior to offloading payload information to the subassembly 402. The integrated circuit 404 may identify the corresponding incoming downstream frame formats for the particular ONU/ONT and the location, length and value of the various subfields contained in the overhead field. On the transmitter side, the integrated circuit 404 may create the transmitted data overheads based on information from the receiver side as well as information (such as payload information) from the subassembly 402. In fact, one of the advantages of the architecture 400 is that in some examples information obtained from processing the received data may be used to directly control processing of transmitter data without resorting to offloading all such data retrieval and reconstruction to the subassembly 402. In this way, internal delays in a processing unit of a PON (e.g., an ONU or ONT) may be reduced. Further, because clock data recovery may be performed within the integrated circuit 404 and communicated directly with the transmitter within the integrated circuit 404, the architecture 400 may be used to more accurately correct for internal delays.

Additional attendant potential benefits will be apparent. For example, by using the integrated circuit 404 as a pre-processor for the subassembly 402, the architecture 400 may be able to perform error correction and detection on a receiver side and instruct a transmitter side to send responsive data, prior to offloading payload to the subassembly 402, or at least without concern for whether the offloaded payload has been processed by the subassembly 402. This ability may be particularly useful in a ranging context, where an OLT is attempting to locate an ONU/ONT and properly synchronize its data. Furthermore, this ability may be useful when there are problems in the received data. Instead of offloading the payload itself to the subassembly 402 for time consuming calculations on that data, the integrated circuit 404 may identify the data as bad data and corresponding reply to the downstream source, e.g., the OLT.

The subassembly 402 may be provided as part of a system-on-a-chip (SoC) which may be re-usable for a variety of different implementations, including implementation of different integrated circuits as discussed below. As such, the subassembly 402 provides a "snap-and-run" architecture in which a variety of chips may be coupled to the subassembly 402, and the subassembly 402 is not limited to ONUs 104/ONTs 108, much less the example provided herein. The subassembly 402 may therefore be used to reduce the time-to-market chip assembly, as it can be used among a variety of chip designs and to build different chips.

Generally, the subassembly 402 includes an SoC processor 406 for processing the non-time sensitive functions and a memory interface 408 coupled to the SoC processor 406. A memory 410 is further provided and coupled to the memory interface 408 for buffering data from the integrated circuits 404 (e.g., packet buffering) and may include embedded memory management. The memory 410 thereby stores data for execution of non-time sensitive functions to be processed by the SoC processor 406. The SoC processor 406 controls the memory 410 and movement of data packets in and out of the memory 410 as needed.

The SoC processor 406 and the memory 410 are provided external to the integrated circuit 404 to support the processing of non-time sensitive functions while the processing of time-sensitive functions is handled by the integrated circuit 404. Accordingly, the SoC processor 406 and memory 410 may be used to minimize the amount of processing required at the chip level (e.g., packet level). That is, non-time sensitive functions that require additional processing complexity may be passed from the integrated circuits 404 to the subassembly 402. Different types of memories may be used for the memory 410, including double data rate (DDR) memory, flash memory, etc. The memory interface 408 may be provided as an interface corresponding to the memory 410 (e.g., a DDR memory interface, flash memory interface, etc.). The subassembly 402 may further include additional components, such as a debugging port, e.g., joint task action group (JTAG) port 412, an input/output interface (e.g., a general purpose input/output (GPIO) 414, or a receiver and/or transmitter, e.g., universal asynchronous receiver/transmitter (UART) 416. The devices 412-416, the memory 408 and the processor 406 are all coupled to a backplane bus 418 of the SoC subassembly 402. The integrated circuit 404, which may be a GPON chip 404, communicates with the SoC subassembly 402 through an interface coupled to the backplane bus 418. Further disclosure of the GPON chip 404 is provided by way of example below. Generally, the GPON chip 404 includes an internal processor, and an SoC interface to the SoC subassembly 402 which interfaces with the SoC processor 406 and with the memory 410 via the memory interface 408. It should be understood that while the architecture 400 is described with reference to particular components, integrated circuits and particular transmission standards, the architecture 400 may be readily applied to different components and standards where time-sensitive and non-time sensitive functions may be applicable, including, but not limited to, wireless and wireline technologies.

Figure 4B:
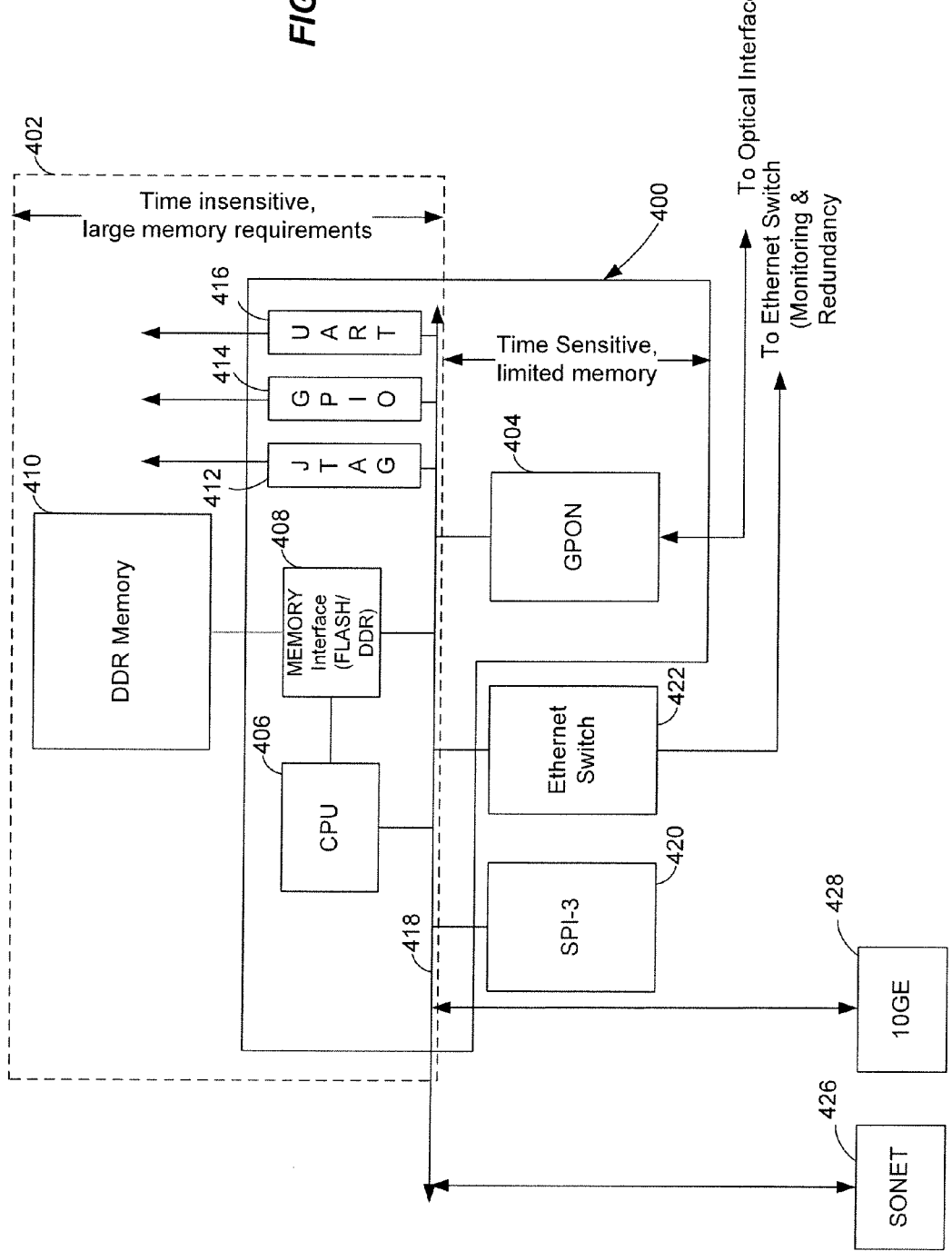
Figure 4D:
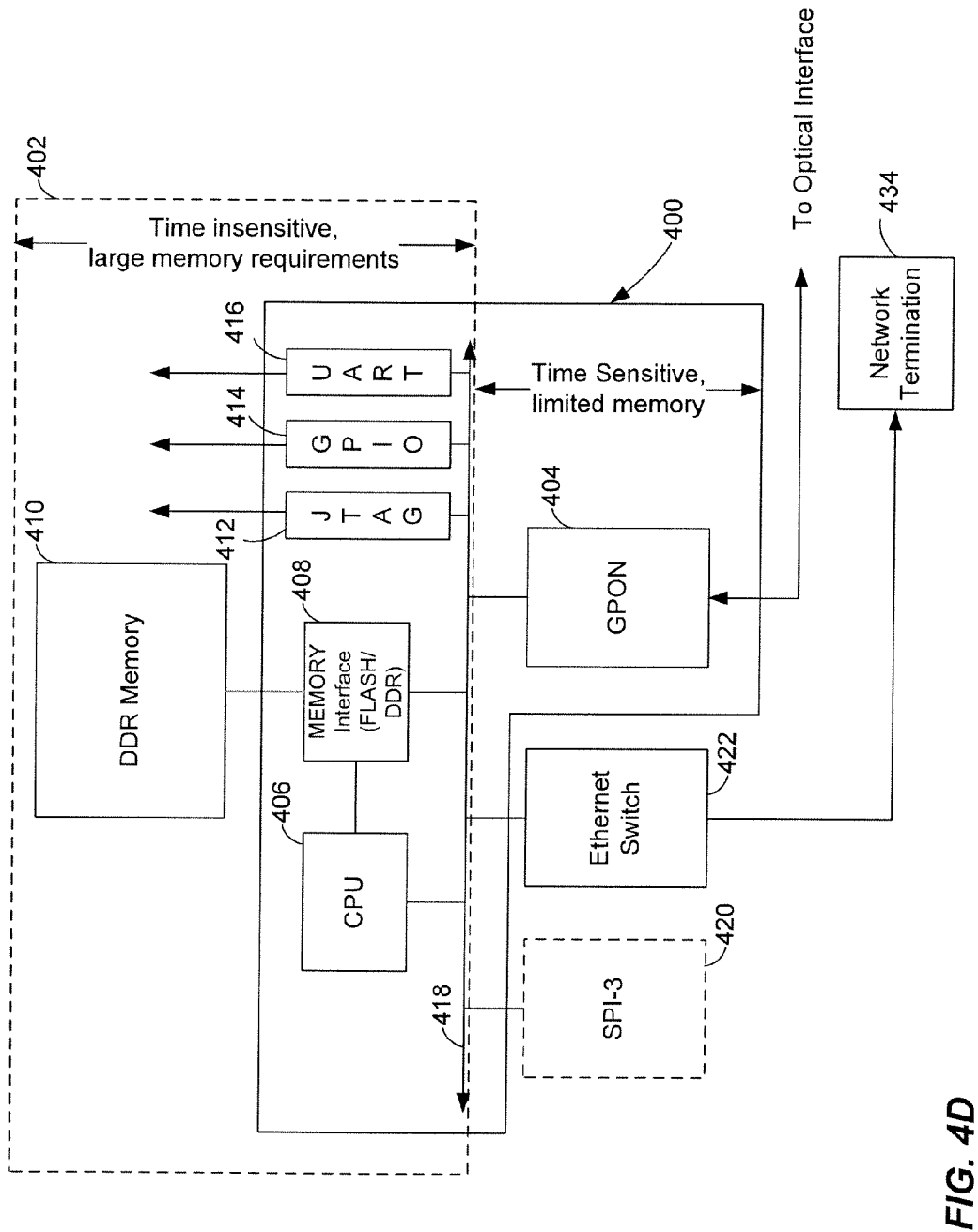
Figure 5A:
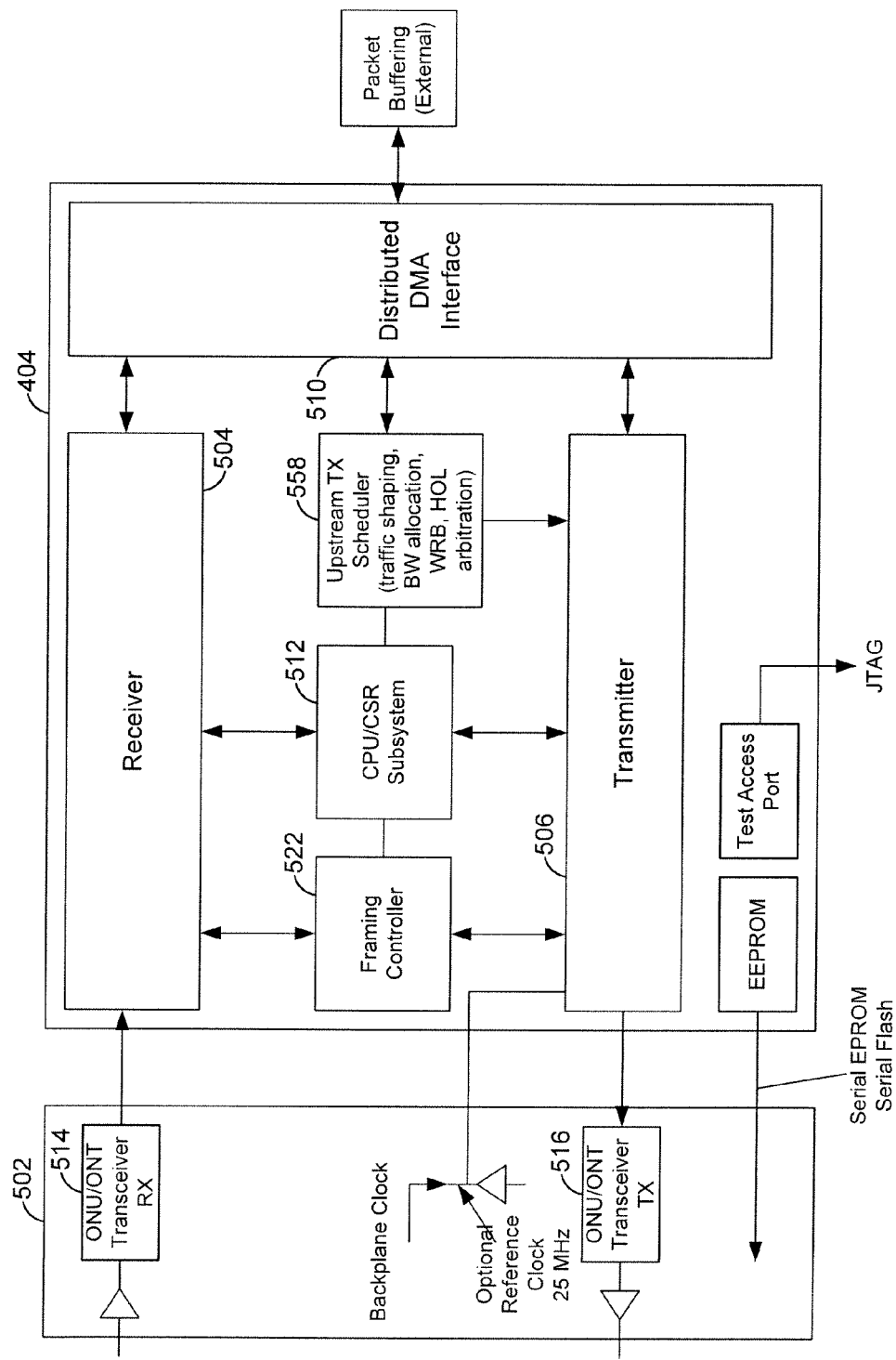
FIGS. 5A-5D are block diagrams of an example gigabit passive optical network chip of the integrated circuit within the passive optical network device shown in FIGS. 4A, 4C, and 4D.
Figure 5B:
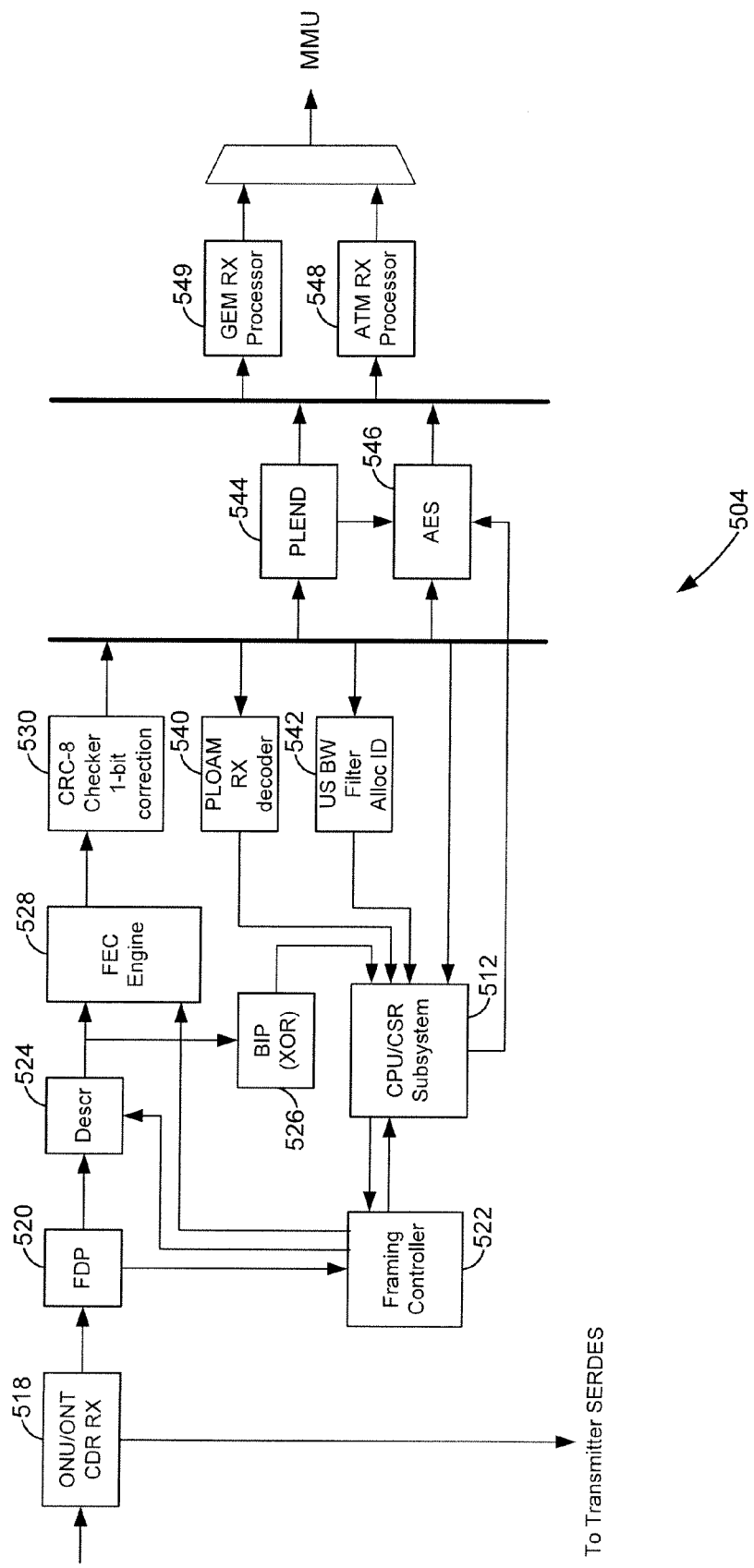
Figure 5C:
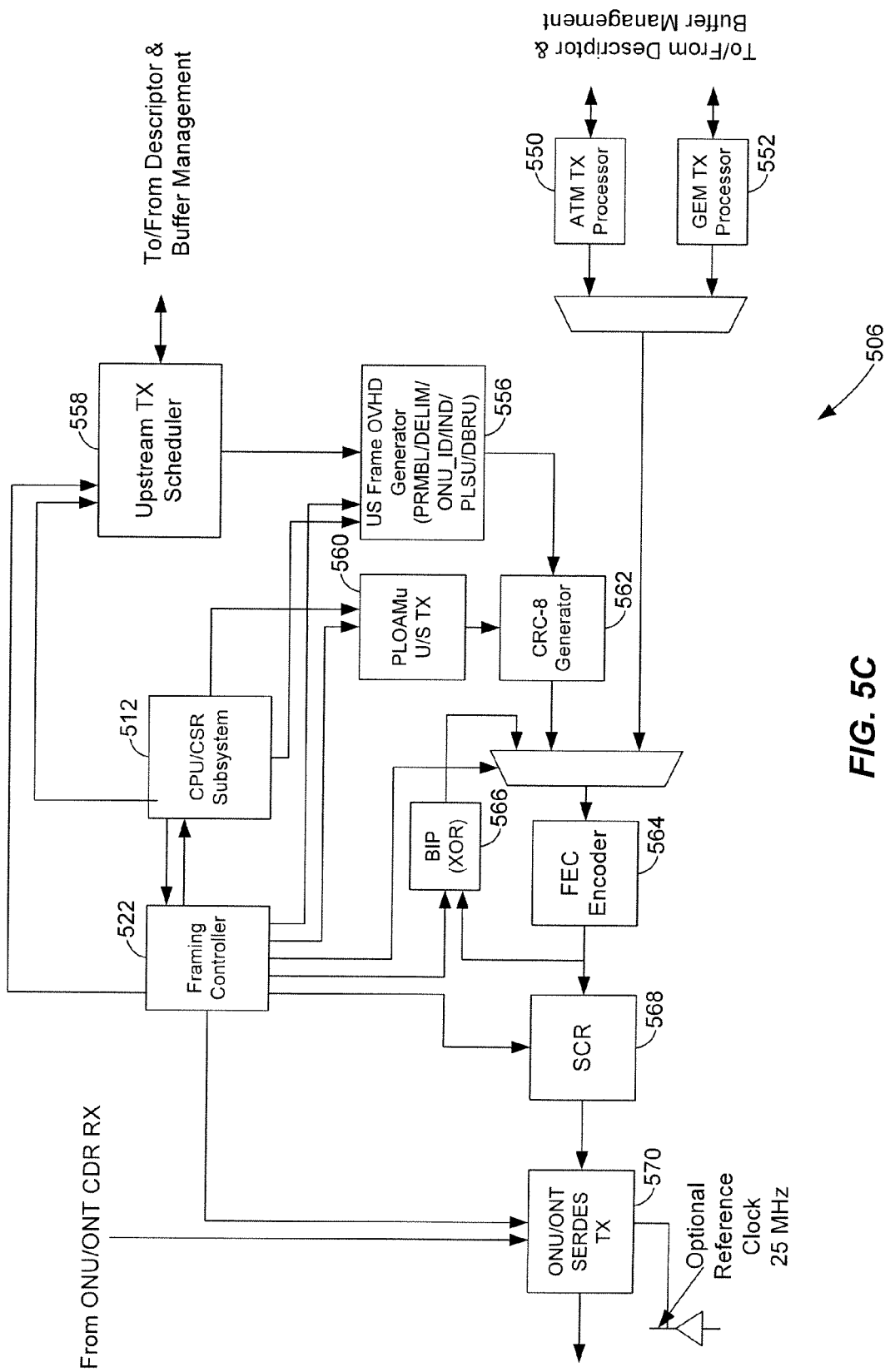
Figure 5D:
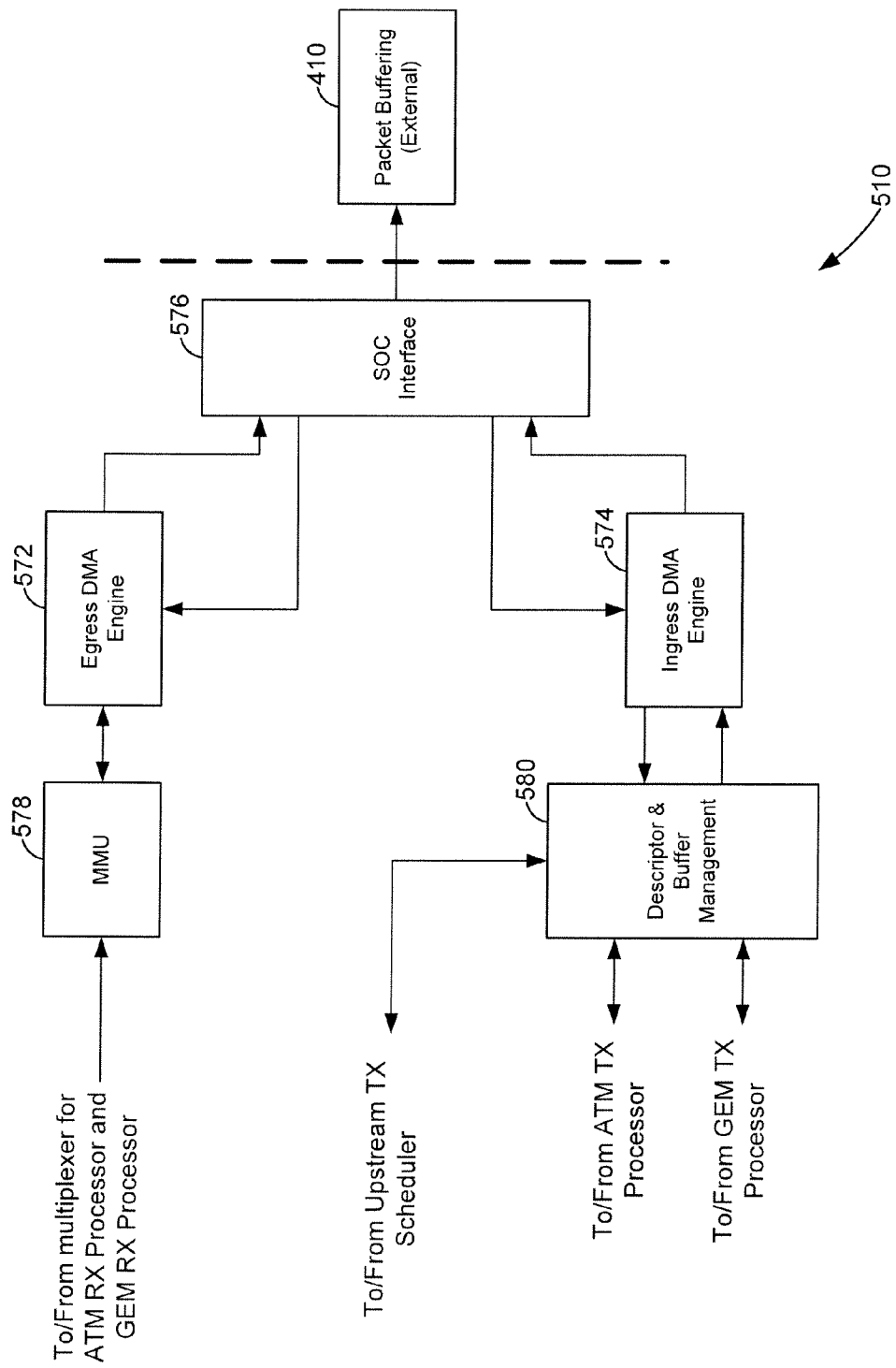

While the architecture 400 may include only a passive optical network communicatively coupled to the SoC subassembly 402, the SoC subassembly 402 may be coupled to other types of networks or layers. For example, as shown in FIGS. 4B-4D, the SoC subassembly 402 may be coupled to a system packet interface level 3 (SPI-3) circuit 420 for chip-to-chip packet communications through a backplane. In some other examples, the SoC subassembly 402 may be coupled to an Ethernet switch 422, for example for monitoring and redundancy or for connecting to an Ethernet distribution network or network termination device.

FIGS. 4B-4D show example implementations of the architecture 400 used in an OLT, ONT, and ONU application, respectively. FIG. 4B, for example, shows an OLT application in which the SPI-3 circuit 420 is coupled to the backplane bus 418 as are a synchronous optical network (SONET) 426 and a 10 Gigabit Ethernet network 428. FIG. 4C shows an ONT application in which the backplane bus 418 couples the SPI-3 interface 420 to a very high density digital subscriber line (e.g., VDSL or VDSL2) distribution network 430 and an asymmetric digital subscriber line (e.g., ADSL or ADSL2) distribution network 432. FIG. 4D shows an ONU application, in which the SPI-3 interface 420 is optional and the Ethernet interface 422 is coupled to an Ethernet network termination 434, like the NT 112 shown in FIG. 1. Other layers may also be supported by the architecture 400. Generally, whenever a division of the time sensitive versus non-time sensitive functions is desired, each integrated circuit included in the architecture 400 may include an internal processor for execution of the time sensitive functions and an SoC interface to forward data packets for non-time sensitive functions to the sub-assembly 402 for execution therein.

In the context of an ONU or ONT, the GPON chip 404 may include a transmitter for assembling and transmitting upstream burst transmissions to an OLT, a receiver for receiving downstream transmissions from the OLT, and an optoelectronic interface to the passive optical network. The internal processor of the ONU/ONT may therefore be used to perform time-sensitive functions associated with the ONU/ONT, such as assembling the overhead field 302 of an upstream transmission along with functions associated therewith, and processing the overhead field 202 of a downstream transmission along with the functions associated therewith. In the example provided below, the GPON chip 404 is described with reference to the upstream and downstream GPON transmission convergence frame formats discussed above. However, it is noted that the inclusion of an internal processor in the GPON chip 404 not only allows for execution of time sensitive functions, but also provides the flexibility to adapt the GPON chip 404 to changes in the GTC frame formats and other related GPON functions including MAC, etc.

FIGS. 5A-5D are block diagrams of an example of a GPON chip 404 as shown in FIG. 4A and which may be used in the ONU 104 or ONT 108. The chip will be described in the context of the GTC frame formats discussed above. In particular, the GPON chip 404 is coupled to the passive optical network 100 via an optoelectronic transceiver interface 502, and includes a receiver 504 for receiving downstream transmissions from the OLT 102, a transmitter 506 for assembling and transmitting upstream burst transmissions to the OLT 102, a distributed direct memory access (DMA) interface 510 to interconnect with the subsystem 402, and an internal processor 512 for processing time-sensitive functions associated with the transmission, such as processing the overhead of downstream transmission and assembling the frame of an upstream burst transmission.

The optoelectronic interface 502 generally includes an optoelectronic transceiver receiver 514 coupled to the receiver 504, and an optoelectronic transceiver transmitter 516 coupled to the transmitter 506, though it should be understood that different optoelectronic interfaces may be used. Upstream GTC frame formatted data is transmitted from the ONT 108/ONU 104 over the fiber 106, 110, respectively, from the transceiver 516. Downstream GTC frame formatted data is transmitted from the OLT 102 to the transceiver 514 over the fibers 106 and 110.

The receiver 504 generally conforms to the downstream transmission format used by the OLT 102, such as the downstream GTC frame format provided above. In the example provided, the receiver 504 includes a clock and data recovery (CDR) unit 518 that receives the downstream transmission via the transceiver 514. The CDR unit 518 recovers the network clock and aligns the data unit with the recovered clock to be provided to the next receiving stage. The CDR unit 518 also recognizes whether the downstream transmission is a valid transmission (e.g., whether the transmission is a downstream transmission in the specified downstream GTC frame format). The CDR unit 518 also recognizes the speed at which the downstream transmission is being transmitted and recovers the particular clock associated with the burst transmission.

Once the CDR unit 518 has recovered the associated clock, the clock and data is provided to a Frame Delineation Processor. The FDP unit 520 determines where the start of the downstream frame along with the validation data, the transmission speed, and the recovered clock. The FDP unit 520 determines where the downstream frame transmission is as the information comes in. In particular, the FDP unit 520 processes the Psync frame 206 to synchronize the ONU/ONT 104, 108 to the incoming message and to identify where information in the frame begins and to determine the boundary of the downstream transmission.

In the context of the ONU/ONT 104, 108, the FDP unit 520 synchronizes to the downstream frame format by executing a hunt state, in which the FDP unit 520 searches for a Psync pattern in the incoming data. Once a correct Psync pattern is found, the FDP unit 520 transitions into the pre-sync state and sets a counter, N, to value 1. The FDP unit 520 then looks for another Psync pattern that follows the last one by 125 μs. For every correct Psync field, the counter is incremented. If an incorrect Psync field is found, the FDP unit 520 transitions back to the hunt state. In the pre-sync state, once the counter equals a first threshold value, the FDP unit 520 transitions the ONU/ONT 104, 108 forward into the sync state, after which the ONU/ONT 104, 108 can declare that it has found the downstream frame structure, and can begin to process the Ident field 208. If the FDP unit 520 detects a threshold number of consecutive incorrect Psync fields, then the ONU/ONT 104, 108 can declare that it has lost downstream frame alignment, and transition back to the hunt state.

The combination of the CDR unit 518 and the FDP unit 520 allows for recovery of downstream transmissions at different speeds and allows for synchronizing with different clocks associated with the various transmissions.

Once the FDP unit 520 has recognized where the ONU 104/ONT 108 is with reference to the downstream transmission, the additional fields of the header 202 may be processed by the receiver 504 in combination with the internal processor 512. In particular, the GPON chip 404 further includes a framing controller 522 that interacts with the transmitter 506 and the internal processor 512 to control the upstream burst transmissions of the transmitter 506. In processing the delimiter for example, the FDP unit 520 may provide the framing controller 522 with a start of frame signal and frame counter signal, which may be used by the framing controller 522 and the internal processor 512 for enabling various functions in the transmitter 506 including the formation of the overhead frame for upstream burst transmission.

The FDP unit 520 forwards the downstream transmission to a descrambler 524. The descrambler 524 may be enabled by the framing controller 522 via an enable signal. The descrambler 524 descrambles the downstream transmission according to the scrambling technique utilized by the OLT, such as frame-synchronous scrambling polynomial.

The descrambled data and a descramble data provision signal are provided to a bit interleaved parity (BIP) unit 526. These data, along with a descrambled start of field signal and a descramble count signal, are also provided to a forward error correction (FEC) engine 528. The BIP unit 526 processes the BIP field 212 to retrieve the bit interleaved parity provided therein. The BIP unit 526 separately generates the bit interleaved parity and compares the computed result to that of the BIP field 212 in order to measure the number of errors in the link since the last bit interleaved parity. In particular, the computed BIP and the BIP from the BIP field 212 may be XOR'ed by the BIP unit 526. The result of the comparison is provided to the internal processor 512, and the internal processor 512 may determine the number of errors in the communication link between the OLT 102 and the ONT 104/ONU 108 based on the comparison.

The internal processor 512 also calculates a ranging delay for the ONU 104/ONT 108 and communicates that delay to the framing controller 522.

The FEC engine 528 performs forward error correction on the transmission based on the FEC field 220 and the FEC field 258. In particular, the FEC engine 528 may process a redundant field in the overhead of the downstream transmission to detect and correct errors therein. The FEC engine 528 forwards the downstream transmission header and payload data and an enable signal to a cyclic redundancy checker (CRC) 530, which processes the CRC fields 232, 238, and 252, and performs error detection and correction for the corresponding headers or other data fields. In the illustrated example, the CRC 530 detects and corrects for errors in the PLOAM field 210, the Plend fields 214, 216, and the US BW field 218, respectively. As indicated above, the cyclic redundancy check may be a CRC-8.

The CRC 530 may then provide the downstream transmission data, and the results of the cyclic redundancy check to a bus coupled to a downstream physical layer operations and maintenance (PLOAM) decoder 540, to an upstream bandwidth (US BW) filter allocation identification unit 542, to Plend unit 544, and an advanced encryption standard (AES) unit 546.

The PLOAM decoder 540 filters and decodes any physical layer operations and maintenance messages from the PLOAM field 210 and provides the processed data and a validity signal to the CPU subsystem 512. The internal processor 512 may then process the message and perform any corresponding functions, such as controlling a PLOAM upstream controller (discussed below) that sends PLOAM data from the ONU 104/ONT 108 to the OLT 102. Examples of functions or uses of various PLOAM messages are provided above.

The US BW unit 542 transmits the downstream bandwidth allocation data from the OLT 102 to the internal processor 512, which data may include the data from the Alloc ID field 244 and the Flags field 246, which allows the internal processor 512 to confirm identification of the ONU 104/ONT 108 and the bandwidth mapping assigned thereto.

The Plend unit 544 processes the Blen field 234, to determine the length of the US BW field 218, and the Alen field 236, to determine the length of the ATM partition field 264, from the redundant Plend fields 214, 216. The Plend unit 544 communicates that information to the AES unit 546 which may (under control of the internal processor 512) then decrypt the payload data 204, i.e., the ATM partition 264 and the GEM partition 266, respectively, for processing by an ATM processor 548 and a GEM processor 549, respectively.

The ATM and GEM processors 548, 549 recover the ATM cells and GEM fragments from the payload 204, respectively under the control of the PLEND 544 output. The GEM processor 549 may reassemble the GEM fragments as needed. ATM and GEM processor should be well understood and need not be further described.

The transmitter 506 generally conforms to the upstream burst transmission format used by the ONU/ONT 104, 108, such as the upstream burst GTC frame format provided above. In the example provided, the transmitter 506 includes ATM and GEM processors 550, 552 which receive information to be transmitted and format the information into the format of the payload field 303 (e.g., ATM format or GEM format). Generally, the information in the payload is generated externally from the GPON chip 404 and provided to the processors 550, 552. ATM cells and GEM fragments may be multiplexed together in response to control signals from the framing controller 522.

As the payload data is formatted and multiplexed, the transmitter 506 assembles the header of the upstream transmission frame. An overhead frame generator 556 generates the overhead field 302, including the PRMBL field 312, the delimiter field 314, the ONU-ID field 318, the Ind Field 320, and the PLSu field 308 and the DBRu field 310, each of which are explained above. In particular, the transmitter 506 is coupled to an upstream scheduler 558, the framing controller 522 and the internal processor 512. The framing controller 522 enables the operations of the transmitter 506, including enabling the overhead frame generator 556, based upon information from downstream transmissions. The internal controller 512 may provide traffic shaping data and BW allocation data to upstream scheduler 558.

The internal processor 512 may also control a PLOAMu encoder 560 that inserts PLOAM messages into the upstream burst transmission based upon an a PLOAM message data generated by the internal processor 512 from the PLOAM Rx decoder unit 540. The framing controller 522 may enable both the PLOAMu encoder 560 and the frame generator 556. The PLOAMu encoder 560 may provide data to a CRC generator 562 that generates a CRC-8 cyclic redundancy check for the upstream burst transmissions.

The overhead data from the CRC generator 562 along with the payload data are multiplexed together into the upstream burst GTC frame format. The multiplexed data is encoded using forward error correcting (FEC) by an FEC encoder 564. As the data is encoded, a BIP unit 566 enabled by an enable signal from the framing controller 522 generates a bit interleaved parity for a subsequent frame based on the FEC encoded data. The bit interleaved parity of the previously transmitted frame is multiplexed with the overhead data and the payload data. A scrambler 568 scrambles the FEC encoded data and FEC validation data. The scrambled data and scramble validation data is provided to a serializer/deserializer (SERDES) 570 which drives the transmitting transceiver 516.

The distributed DMA interface 510 provides distributed management of the packet buffer (e.g., external memory 410). In particular, the distribute DMA interface 510 provides an interface to the sub-assembly 402, and may be implemented in any integrated circuit 404. The distributed DMA interface 510 includes an egress DMA engine 572 and an ingress DMA engine 574, both engines being coupled to an SoC interface 576. The egress DMA engine 572 is able to write data directly to the external memory 410 via the SoC interface 576, for example, by providing a ready state signal to the subassembly 402 and following a read signal from the subassembly 402. The ingress DMA engine 574 is able to read data directly from the external memory 410 via the SoC interface 576, for example, by providing a ready state signal to the subassembly 402 and following a write signal from the subassembly 402. As discussed above, the SoC processor 406 may typically be responsible for non-time sensitive functions, the data of which is moved in and out of the memory 410 for processing by the SoC processor 406, and which may be provided from or provided to the integrated circuit 404 as needed. The DMA engines 572, 574 thereby provide DMA processing via CPU 406 control of the sub-assembly 402.

In the context of the GPON chip 404 of FIGS. 5A-5D, data written by the egress DMA engine 572 is provided by the receiver 504 via a memory management unit (MMU) 578 coupled to the ATM and GEM processors 548 and 549, respectively, and receives the recovered ATM cells and/or reassembled GEM fragments from these processors. The MMU 578 and egress DMA 572 are provided with the responsibility of moving the information to the external memory 410. In particular, the egress DMA engine 572 notifies the MMU 578 that it is ready to read data, and the MMU 578 manages access of the egress DMA engine 572 and provides the data to be written to the external memory 410. The MMU 578 may further provide event generation and a descriptor pre-fetch engine and table for buffer management.

Data read by the ingress DMA engine 574 from the external memory 410 is provided to the transmitter 506 via a descriptor and buffer management unit 580. The descriptor and buffer management unit 580 may be controlled by the upstream schedule 588 which may provide the unit 580 with a ATM virtual channel signal, a GEM partition identification, and other scheduler information such as a scheduler transmission count. The descriptor and buffer management unit 580 may additionally provide ATM and GEM frame status data to the upstream scheduler 558 for affecting the overhead data to be inserted into the upstream burst transmission. The descriptor and buffer management unit 580 manages access of the ingress DMA engine 574 to the external memory 410. In particular, ingress DMA engine 574 notifies the descriptor and buffer management unit 580 it is ready to provide data, and the descriptor and buffer management unit 580 notifies the ingress DMA engine 574 it is ready to receive the data. Based on the scheduling data from the upstream scheduler 558, provides the data to the ATM and GEM processors 550, 552.

The distributed DMA interface 510 is thereby provided with sufficient memory within the GPON chip 404 to pass information in and out of the GPON chip to a larger external memory by virtue of the MMU 578 and the descriptor and buffer management unit 580. In particular, the GPON chip 404 is able to pass data associated with memory-intensive and/or processor-intensive functions that have low time sensitive requirements (e.g., client payload data) to the external SoC processor 406 and memory 410, and reserve the internal processor 512 for time-sensitive functions, such as processing upstream transmission frame and assembling downstream transmission frames.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. For a point-to-multipoint network, a network termination device integrated circuit comprising:
    a receiver to receive a downstream transmission from an optical line termination unit i) within the point-to-multipoint network and ii) upstream of a network termination device, wherein the downstream transmission comprises a downstream transmission convergence frame format having i) an overhead field and ii) a payload field, and wherein the downstream transmission comprises data associated with executing time-sensitive functions and data associated with executing non-time-sensitive functions;
    a transmitter to transmit an upstream transmission to the line termination unit, wherein the upstream transmission comprises an upstream transmission convergence frame format having i) an overhead field and ii) a payload field, and wherein the upstream transmission comprises data associated with executing time-sensitive functions and data associated with executing non-time-sensitive functions; and an internal processor having an interface to a subassembly, the internal processor to process at least one sub-field within the overhead field of the downstream transmission and to assemble the overhead field of the upstream transmission, wherein the internal processor is to receive and process exclusively the data within each of the upstream transmission and the downstream transmission associated with executing the time-sensitive functions, and wherein after the internal processor receives the data within the downstream transmission associated with executing the time-sensitive functions, the internal processor is to control the receiver to offload the data within the downstream transmission associated with executing the non-time-sensitive functions to an external processor physically located on the subassembly and external to and distinct from the integrated circuit for processing by the external processor.

2. The network termination device integrated circuit of claim 1, wherein the downstream transmission is transmitted from the line termination device at one of a plurality of speeds, and the receiver comprises a clock and data recovery unit to recover a clock from the downstream transmission and to align the clock and data to determine the speed of the downstream transmission.

3. The network termination device integrated circuit of claim 1, wherein the receiver comprises:
   a Frame Delineation Processor unit to process a synchronization field in the overhead field of the downstream transmission to determine a boundary of the downstream transmission; and
   a descrambler to descramble the downstream transmission, after the synchronization field has been identified.

4. The network termination device integrated circuit of claim 1, wherein the receiver comprises:
   a forward error correction unit to process a redundant field in the overhead field of the downstream transmission to detect and correct errors in the downstream transmission;
   a bit-interleaved parity unit to process a bit interleaved parity from the overhead field of the downstream transmission and to compare the bit interleaved parity to a threshold bit interleaved parity, wherein the internal processor is to determine a number of errors in a communication link between the receiver and the line termination unit based on the comparison; and
   a cyclic redundancy checker to process a checksum field within the overhead field of the downstream transmission to detect a transmission error.

5. The network termination device integrated circuit of claim 1, wherein the receiver comprises a physical layer operations and maintenance decoder to decode a physical layer operations and maintenance message from a physical layer operations and maintenance field within the overhead field of the downstream transmission, wherein the internal processor is to perform an operations and maintenance function based on the decoded physical layer operations and maintenance message.

6. The network termination device integrated circuit of claim 1, wherein the receiver comprises an upstream bandwidth report unit to process an upstream bandwidth report field within the overhead field of the downstream transmission to read a traffic status associated with a transmission container, wherein the internal processor is to manage an upstream bandwidth allocation based on the transmission container traffic status, and wherein the internal processor resolves a bandwidth schedule for the upstream transmission i) based on the upstream bandwidth report field, and ii) prior to the payload field for the upstream transmission being sent to the transmitter.

7. The network termination device integrated circuit of claim 1, wherein the receiver comprises a downstream frame processor to recover data from the payload field of the downstream transmission.

8. The network termination device integrated circuit of claim 7, wherein the downstream frame processor comprises at least one of the group consisting of: a gigabit passive optical network (GPON) encapsulation mode (GEM) frame processor to recover a GEM payload within the payload field of the downstream transmission, and an asynchronous transfer mode (ATM) cell frame processor to recover an ATM cell payload within the payload field of the downstream transmission.

9. The network termination device integrated circuit of claim 7, wherein the downstream frame processor comprises an asynchronous transfer mode (ATM) cell frame processor to recover an ATM cell payload within the payload field of the downstream transmission, and wherein the receiver comprises an encryption unit to encrypt the payload field of the downstream transmission.

10. The network termination device integrated circuit of claim 1, wherein the transmitter comprises an upstream frame processor to format data into a format associated with the payload field of the upstream transmission, wherein the upstream frame processor includes (1) a gigabit passive optical network (GPON) encapsulation mode (GEM) frame processor to format data as a GEM encapsulation or (2) an asynchronous transfer mode (ATM) cell frame processor to format data as an ATM cell.

11. The network termination device integrated circuit of claim 1, further comprising an upstream bandwidth controller operatively coupled to the receiver, the internal processor and the transmitter, wherein the upstream bandwidth controller is to enable the operations of the transmitter based on the downstream transmission received via the receiver and based on an upstream bandwidth map from the internal processor, and wherein the transmitter comprises an upstream transmission scheduler to allocate bandwidth for the upstream transmission.

12. The network termination device integrated circuit of claim 1, wherein the transmitter comprises:
   a frame overhead generator to insert the overhead field into the upstream transmission, wherein the frame overhead generator is to insert the payload field into the upstream transmission; and
   a cyclic redundancy check generator to insert a checksum field within the overhead field of the upstream transmission.

13. The network termination device integrated circuit of claim 1, wherein the transmitter comprises a physical layer operations and maintenance encoder to receive a physical layer operations and maintenance message from the internal processor and to insert the physical layer operations and maintenance message into a physical layer operations and maintenance field within the overhead field of the upstream transmission.

14. The network termination device integrated circuit of claim 1, wherein the transmitter comprises:
   a multiplexer to multiplex frame data for the overhead field and the payload field of the upstream transmission into the upstream transmission convergence frame format; and
   a forward error correction encoder to encode the multiplexed frame data.

15. The network termination device integrated circuit of claim 1, wherein the transmitter comprises:
- a bit interleaved parity unit to generate a bit interleaved parity for a subsequent frame;
- a scrambler to scramble the upstream transmission; and
- a serializer/deserializer to drive a transceiver operatively coupled to the transmitter.

16. The network termination device integrated circuit of claim 1, further comprising a distributed direct memory access engine operatively coupled to the receiver and the transmitter, wherein the distributed direct memory access engine is to directly read data from a packet buffer external to the network termination device and to directly write data to the packet buffer external to the network termination device.

17. The network termination device integrated circuit of claim 16, wherein the distributed direct memory access engine comprises:
- an interface to interconnect the network termination device and the packet buffer external to the network termination device;
- an ingress direct memory access engine operatively coupled to the interface and to read data from the packet buffer external to the network termination device and provide the read data to the transmitter; and
- an egress direct memory access engine operatively coupled to the interface and to write data from the payload field of the downstream transmission to the packet buffer external to the network termination device via the interface.

18. The network termination device integrated circuit of claim 17, wherein the distributed direct memory access engine further comprises:
- a memory management unit to manage access of the egress direct memory access engine to the packet buffer external to the network termination device and to provide the write data from the receiver to the egress direct memory access engine; and
- a descriptor and buffer management unit i) to receive scheduling data from the transmitter and ii) to manage access of the ingress direct memory access engine to the packet buffer external to the network termination device based on the scheduling data and iii) to provide the read data from the ingress direct memory access engine to the transmitter.

19. The network termination device integrated circuit of claim 17, wherein the interface comprises a system-on-a-chip (SoC) interface to interconnect the network termination device with a system-on-a-chip (SoC) external to the network termination device, wherein the system-on-a-chip external to the network termination device comprises:
- the external processor, the external processor to control the packet buffer external to the network termination device; and
- a memory interface operatively coupled to the external processor and operatively coupled to the packet buffer external to the network termination device.

20. The network termination device integrated circuit of claim 19, wherein the time-sensitive functions require execution within a threshold time period, wherein the non-time-sensitive functions do not require execution within the threshold time period, and wherein the internal processor is to execute the time-sensitive functions and the external processor is to execute the non-time-sensitive functions.

21. The network termination device integrated circuit of claim 16, wherein the receiver decrypts the payload field from the downstream transmission prior to directly writing data to the packet buffer external to the network termination device.

22. The network termination device integrated circuit of claim 1, wherein the network termination device is an optical network unit (ONU) or an optical network termination (ONT).

23. The network termination device integrated circuit of claim 1, wherein the internal processor is programmed to process the at least one sub-field within the overhead field of the downstream transmission and assemble at least one sub-field of the overhead field of the upstream transmission prior to controlling the receiver to offload the data within the downstream transmission associated with executing the non-time-sensitive functions to the external processor for processing.

24. The network termination device integrated circuit of claim 23, wherein the internal processor is programmed to process all sub-fields within the overhead field of the downstream transmission prior to controlling the receiver to offload the data within the downstream transmission associated with executing the non-time-sensitive functions to the external processor for processing.

25. The network termination device integrated circuit of claim 1, wherein the upstream transmission and the downstream transmission have different frame formats.

26. The network termination device integrated circuit of claim 1, wherein the internal processor is to process all sub-fields within the overhead field of the downstream transmission that are to be processed.

27. The network termination device integrated circuit of claim 1, wherein the internal processor is to process all sub-fields within the overhead field of the downstream transmission.

28. The network termination device integrated circuit of claim 1, wherein the time-sensitive functions are functions requiring execution within a threshold time period, and wherein the non-time-sensitive functions are functions not requiring execution within the threshold time period.

29. The network termination device integrated circuit of claim 1, wherein the external processor is to process exclusively the data within the downstream transmission associated with executing the non-time-sensitive functions and the data within the upstream transmission associated with executing the non-time-sensitive functions.

30. An integrated circuit disposed within one of a plurality of network termination devices of a passive optical network (PON), the integrated circuit comprising:
- a receiver to receive a downstream transmission from an optical line termination (OLT) that is i) within the PON and ii) upstream of the one network termination device, wherein the downstream transmission comprises a downstream transmission convergence frame format having i) an overhead field and ii) a payload field, wherein the downstream transmission from the OLT comprises data for each of the plurality of network termination devices of the PON, wherein a portion of the data within the downstream transmission from the OLT is data associated with executing time-sensitive functions, and wherein a portion of the data within the downstream transmission from the OLT is data associated with executing non-time-sensitive functions;
- a transmitter to transmit an upstream transmission to the OLT within an interval of time assigned to the one network termination device so as to avoid collision of the upstream transmission with upstream transmissions sent from other ones of the plurality of network termination devices to the OLT within other intervals of time, wherein the upstream transmission from the one network termination device to the OLT comprises an upstream transmission convergence frame format having i) an overhead field and ii) a payload field, and wherein the upstream transmission from the one network termination device to the OLT comprises data associated with executing time-sensitive functions and data associated with executing non-time-sensitive functions; and an internal processor having an interface for coupling to a subassembly, the internal processor to process exclusively the data within each of the downstream transmission and the upstream transmission associated with executing the time-sensitive functions, wherein after the internal processor receives and processes at least a portion of the data within the downstream transmission associated with executing the time-sensitive functions:

when the one network termination device is to be ranged by the OLT, the internal processor is to cause the transmitter to transmit, to the OLT, data that is responsive to the downstream transmission and that the OLT is to use in ranging the one network termination device, without the data within the downstream transmission associated with executing the non-time-sensitive functions being processed; and when the one network termination device is not to be ranged by the OLT, the internal processor is to control the receiver to offload the data within the downstream transmission associated with executing the non-time-sensitive functions to an external processor physically located on the subassembly and external to and distinct from the integrated circuit for processing by the external processor.

31. The integrated circuit of claim 30, wherein the time-sensitive functions are functions requiring execution within a threshold time period, and wherein the non-time-sensitive functions are functions not requiring execution within the threshold time period.

32. The integrated circuit of claim 30, wherein the at least the portion of the data within the downstream transmission associated with executing the time-sensitive functions is at least one sub-field within the overhead field of the downstream transmission, so that the internal processor is configured to cause the transmitter to transmit the data that is responsive to the downstream transmission or to control the receiver to offload the data within the downstream transmission associated with executing the non-time-sensitive functions after the internal processor receives and processes the at least one sub-field within the overhead field of the downstream transmission.

33. The integrated circuit of claim 30, wherein the at least the portion of the data within the downstream transmission associated with executing the time-sensitive functions is all sub-fields within the overhead field of the downstream transmission that are to be processed, so that the internal processor is configured to cause the transmitter to transmit the data that is responsive to the downstream transmission or to control the receiver to offload the data within the downstream transmission associated with executing the non-time-sensitive functions after the internal processor receives and processes all the sub-fields within the overhead field of the downstream transmission that are to be processed.

34. The integrated circuit of claim 30, wherein the external processor is within the network termination device.

35. The integrated circuit of claim 30, wherein the network termination device is an optical network unit (ONU) or an optical network termination (ONT).

* * * * *